United States Patent
Muhammad et al.

(10) Patent No.: US 12,363,613 B2
(45) Date of Patent: Jul. 15, 2025

(54) BACKHAUL ADAPTATION PROTOCOL PATH IDENTITY FOR FAIR SCHEDULING IN AN INTEGRATED ACCESS BACKHAUL NODE

(71) Applicant: Telefonaktiebolaget LM Ericsson (PUBL), Stockholm (SE)

(72) Inventors: Ajmal Muhammad, Sollentuna (SE); Jose Luis Pradas, Stockholm (SE); Oumer Teyeb, Montréal (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 314 days.

(21) Appl. No.: 17/799,844

(22) PCT Filed: Feb. 19, 2021

(86) PCT No.: PCT/IB2021/051440
§ 371 (c)(1),
(2) Date: Aug. 15, 2022

(87) PCT Pub. No.: WO2021/165915
PCT Pub. Date: Aug. 26, 2021

(65) Prior Publication Data
US 2023/0083708 A1    Mar. 16, 2023

Related U.S. Application Data

(60) Provisional application No. 62/979,171, filed on Feb. 20, 2020.

(51) Int. Cl.
*H04W 40/02* (2009.01)
*H04W 40/24* (2009.01)
*H04W 88/08* (2009.01)

(52) U.S. Cl.
CPC ....... *H04W 40/248* (2013.01); *H04W 40/246* (2013.01); *H04W 88/08* (2013.01)

(58) Field of Classification Search
CPC ............ H04L 45/037; H04W 28/0268; H04W 40/12; H04W 40/24; H04W 40/246;
(Continued)

(56) References Cited

U.S. PATENT DOCUMENTS 11,284,327 B2 *  3/2022  Cho ........................ H04L 45/28
11,800,429 B2 * 10/2023  Deshmukh ............ H04W 40/24
(Continued)

FOREIGN PATENT DOCUMENTS

CN    110636583 A    12/2019
WO    2019192607 A1  10/2019
(Continued)

OTHER PUBLICATIONS

Technical Specification, 3GPP TS 38.340, 3rd Generation Partnership Project; Technical Specification Group Radio Access Network; NR; Backhaul Adaptation Protocol (BAP) specification (Release 16), V0.1.1, 15 pages, Nov. 2019.*
(Continued)

*Primary Examiner* — Frank Duong
(74) *Attorney, Agent, or Firm* — Baker Botts L.L.P.

(57) ABSTRACT

A method where a first network node receives from a second network node a packet with a path identifier value in the header. A plurality of bearers associated with the path are determined based on the path identifier value and used to assign at least one resource to the packet before it is transmitted to a third network node based on the at least one resource.

26 Claims, 21 Drawing Sheets

(58) Field of Classification Search
CPC ... H04W 40/248; H04W 76/10; H04W 76/12; H04W 88/08; H04W 92/12; H04W 92/20; H04W 92/22; H04W 92/24
See application file for complete search history.

(56) References Cited

U.S. PATENT DOCUMENTS

| | | | | |
|---|---|---|---|---|
| 11,856,619 | B2* | 12/2023 | Teyeb | H04W 76/10 |
| 11,864,085 | B2* | 1/2024 | Tesanovic | H04W 40/22 |
| 2022/0182917 | A1* | 6/2022 | Muhammad | H04W 40/248 |
| 2022/0225129 | A1* | 7/2022 | Chen | H04W 40/34 |
| 2022/0272564 | A1* | 8/2022 | Teyeb | H04W 76/11 |
| 2022/0393966 | A1* | 12/2022 | Eriksson | H04L 45/20 |
| 2024/0236811 | A9* | 7/2024 | Tesanovic | H04L 45/48 |

FOREIGN PATENT DOCUMENTS

| | | |
|---|---|---|
| WO | 2019241992 A1 | 12/2019 |
| WO | 2019242683 A1 | 12/2019 |
| WO | 2020031004 A1 | 2/2020 |

OTHER PUBLICATIONS

Polese, M., et al., "End-to-End Simulation of Integrated Access and Backhaul at mmWaves", 2018 IEEE 23rd International Workshop on Computer Aided Modeling and Design of Communication Links and Networks (CAMAD), 7 Pages.

Wang, J., et al., "Start-up and Connection Process of 5G IAB Basestation", Communications Technology, vol. 52, No. 4, Apr. 2019, 4 Pages, English Abstract.

3GPP TS 38.331 v15.0.0; 3rd Generation Partnership Project; Technical Specification Group Radio Access Network; NR; Radio Resource Control (RRC) protocol specification (Release 15)—Dec. 2017.

3GPP TSG-RAN WG3 Meeting #106; Reno, NV, USA; title: Routing in IAB network; Source: Huawei (R3-196992 (revision of R3-195463))—Nov. 18-22, 2019.

PCT International Search Report issued for International application No. PCT/IB2021/051440—May 19, 2021.

PCT Written Opinion of the International Searching Authority issued for International application No. PCT/IB2021/051440—May 19, 2021.

* cited by examiner

BACKHAUL ADAPTATION PROTOCOL PATH IDENTITY FOR FAIR SCHEDULING IN AN INTEGRATED ACCESS BACKHAUL NODE

PRIORITY

This nonprovisional application is a U.S. National Stage Filing under 35 U.S.C. § 371 of International Patent Application Serial No. PCT/IB2021/051440 filed Feb. 19, 2021 and entitled "BACKHAUL ADAPTATION PROTOCOL PATH IDENTITY FOR FAIR SCHEDULING IN AN INTEGRATED ACCESS BACKHAUL NODE" which claims priority to U.S. Provisional Patent Application No. 62/979,171 filed Feb. 20, 2020, both of which are hereby incorporated by reference in their entirety.

TECHNICAL FIELD

The present disclosure relates, in general, to wireless communications and, more particularly, systems and methods for Integrated Access Backhaul Node Backhaul Adaptation Protocol Path Identity for fair scheduling.

BACKGROUND $3^{rd}$ Generation Partnership Project (3GPP) is currently standardizing integrated access and wireless access backhaul (IAB) in New Radio (NR) in Rel-16 (RP-192188). The usage of short range mmWave spectrum in NR creates a need for densified deployment with multi-hop backhauling. However, optical fiber to every base station will be too costly and sometimes not even possible (e.g. historical sites). The main JAB principle is the use of wireless links for the backhaul (instead of fiber) to enable flexible and very dense deployment of cells without the need for densifying the transport network. Use case scenarios for JAB can include coverage extension, deployment of massive number of small cells and fixed wireless access (FWA) (e.g. to residential/office buildings). The larger bandwidth available for NR in mmWave spectrum provides opportunity for self-backhauling, without limiting the spectrum to be used for the access links. On top of that, the inherent multi-beam and Multiple Input Multiple Output (MIMO) support in NR reduces cross-link interference between backhaul and access links allowing higher densification.

During the study item phase of the JAB work (summary of the study item can be found in the technical report 3GPP TR 38.874 v. 16.0.0), it has been agreed to adopt a solution that leverages the Central Unit (CU)/Distributed Unit (DU) split architecture of NR, where the JAB node will be hosting a DU part that is controlled by a central unit. The JAB nodes also have a Mobile Termination (MT) part that they use to communicate with their parent nodes.

The specifications for JAB strive to reuse existing functions and interfaces defined in NR. In particular, MT, gNodeB-DU (gNB-DU), gNodeB-CU (gNB-CU), User Plane Function (UPF), Access and Mobility Management Function (AMF) and Session Management Function (SMF) as well as the corresponding interfaces NR Uu (between MT and gNB), F1, NG, X2 and N4 are used as baseline for the JAB architectures. Modifications or enhancements to these functions and interfaces for the support of JAB will be explained in the context of the architecture discussion. Additional functionality such as multi-hop forwarding is included in the architecture discussion as it is necessary for the understanding of JAB operation and since certain aspects may require standardization.

The MT function has been defined as a component of the JAB node. In the context of this study, MT is referred to as a function residing on an IAB-node that terminates the radio interface layers of the backhaul Uu interface toward the IAB-donor or other IAB-nodes.

FIG. 1 illustrates a reference diagram for JAB in stand-alone mode, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

FIG. 2 illustrates the baseline user plane protocol stacks for IAB, and FIGS. 3A, 3B, and 3C illustrate the baseline control plane protocol stacks for IAB. As depicted, the chosen protocol stacks reuse the current CU-DU split specification in Rel-15, where the full user plane F1-U (GTP-U/UDP/IP) is terminated at the JAB node (like a normal DU) and the full control plane F1-C (F1-AP/SCTP/IP) is also terminated at the JAB node (like a normal DU). In the above cases, Network Domain Security (NDS) has been employed to protect both UP and CP traffic (IPsec in the case of UP, and DTLS in the case of CP). IPsec could also be used for the CP protection instead of DTLS (in this case no DTLS layer would be used).

A new protocol layer called Backhaul Adaptation Protocol (BAP) has been introduced in the JAB nodes and the IAB donor, which is used for routing of packets to the appropriate downstream/upstream node and also mapping the UE bearer data to the proper backhaul RLC channel (and also between ingress and egress backhaul RLC channels in intermediate JAB nodes) to satisfy the end to end QoS requirements of bearers.

At the RAN2 #105 meeting, the modelling of the Adaptation layer has been discussed and the following was agreed:
  RAN2 confirms that routing and bearer mapping (e.g. mapping of Backhaul (BH) Radio Link Control (RLC) channels) are adaptation layer functions
  R2 assumes that TX part of adaptation layer performs routing and "bearer mapping", RX part of adaptation layer performs "bearer demapping"
  R2 assumes that SDUs are forwarded from RX part of adaptation layer to TX part of adaptation layer (for the next hop) for packets that are relayed by the JAB node.
  It is for future study (FFS) how to model with regard to protocol entities, e.g. whether separate for DU and MT or not, and FFS how these are configured, F1-AP or RRC.
Several other agreements related to BAP layer were made in subsequent RAN2 meetings, which are illustrate below:
  BAP has a DU part configured by F1-AP and a MT part configured by RRC.
  A BAP DU part and MT part each has one transmitter and one receiver.
  The BAP Routing ID (carried in the BAP header) consists of BAP address and BAP path ID.

Each BAP address defines a unique destination (unique for JAB network of one Donor, either an JAB access node, or the IAB donor).

Each BAP address can have one or multiple entries in the routing table to enable local route selection. Multiple entries are for load balancing, re-routing at RLF. For load balancing still FFS what is decided locally and/or decided by the IAB-donor-CU.

Each BAP Routing ID has only one entry in the routing table.

The BAP address of the IAB node is used to differentiate traffic to be delivered to upper layers from traffic to be delivered to egress RLC layer (FFS for the Donor node).

For routing and bearer mapping of a packet retrieved from RLC layer, the IAB-node needs to be configurable with the following mappings:
 BAP routing ID in BAP header ☐ Egress link (routing table)
 Ingress RLC channel ☐ Egress RLC channel (bearer mapping)

For the selection/addition of a BAP routing ID as well as routing and bearer mapping for a packet retrieved from upper layers, the IAB-node and IAB donor needs to be configurable with the following mappings:
 (FFS) Upper layer information ☐ BAP Routing ID to be added in BAP header
 BAP routing ID in BAP header ☐ Egress link
 Upper layer information (FFS) ☐ Egress RLC channel Furthermore, when it comes to the BAP header, the following agreements were made during RAN2_107bis meeting:
 Routing ID is 13 bits.
 There is a C/D bit.
 Length of the BAP address and BAP path ID sub-fields of the BAP routing ID to be fixed/predefined.
 For the DL, BAP address is 10 bits and BAP path ID is 3 bits.
 For the UL, BAP address is FFS bits and BAP path ID is FFS bits.
 R2 expects that there will be no restrictions in the TS to restrict configuration of routing ID and its components. The network has to ensure that e.g. there is no path confusion.

However, RAN2_107bis agreement related to BAP Routing ID was overridden at RAN2_108 with the following agreement:
 For both UL and DL, The BAP header for Data PDU has a length of 3B, which hold 1 D/C bit, 3 R bits, 10 bits for BAP address, and 10 bits for BAP path ID (this overrides earlier agreement).

FIG. 4 illustrates a sample header for the data PDU, where the MSB indicates whether it's a control or data header and then a few reserve bits for flags and future compatibility.

Intra-Donor Routing and BH RLC Channel Configuration

RAN3_103bis made the following agreements related to 1:1 mapping between UE DRB and BH RLC channel:
 For 1:1 mapping, the use of GTP tunnel ID to identify a DRB between donor CU and donor DU is confirmed.
 WA: adopt IPv6 flow labels for 1:1 mapping; FFS whether to also use DSCP.

The bearer mapping was further discussed in RAN3_104 leading to the following agreements:
 Adopt IPv6 flow labels for 1:1 mapping (in conjunction with the JAB node IP address); the use of additional information to differentiate bearers is not precluded.
 WA: For N:1 mapping, both DSCP-based and IPv6 flow-label based mapping may be used in donor DU for DL.
 WA: They may coexist in the same network.

RAN3_105 made additional agreements related to routing and bearer mapping configuration, which are given below:
 On the DL, the IAB-donor DU is configurable with information that allows deriving the BAP routing ID from IP header information for F1-U, F1-C and non-F1 traffic.
 On the DL, the IAB-donor DU is configurable with mappings that allow to derive BH RLC channel from IP header information for F1-U, F1-C and non-F1 traffic.
 On the DL, the IAB-donor is configurable with information that allows deriving the BAP address from the destination IP address.
 The IAB-donor DU is configurable with a mapping between IPv6 Flow Label, DS information and Destination IP address to the BH RLC channel, where any of these three IP header fields are optional in the mapping.
 The configuration of the DL F1-U GTP-U tunnel information on the CU-UP is extended to optionally include IPv6 Flow Label and/or DS information.
 It is FFS to what extent the configuration of the DL X2-U and Xn-U GTP-U tunnel information on the MN is extended to optionally include IPv6 Flow Label and/or DS information.

RAN3_105bis discussed the BAP uplink bearer mapping as well as BAP intra-donor configuration and agreed to the following:
 UL mapping is to configure mapping between GTP-U FTEID (IP address+TEID) and egress backhaul RRC channel
 WA: we support one-step UL mapping (for F1-U and F1-C)
 Configuration of downlink bearer mapping and routing should be performed by F1-AP
 Path id is derived from IP header and mapping provided by CU
 In the DL, for BAP path id derivation on the donor DU: IP address, IPv6 flow level and/or DS/DSCP can be used; all of these fields are optional in F1AP message to configure routing In summary, RAN3 has agreed that the IP address fields of the F1-AP, such as IPv6 flow label, DS/DSCP can be used to configure the BH RLC channels for the UE bearers in the BAP layer of the IAB-donor DU. Similarly, the IP address of the destination IAB node, IPv6 flow label (optional), and DS/DSCP (optionally) can be used to derived/configured the BAP Path ID for the downlink traffic.

There currently exist certain challenge(s). For example, the IAB-network should attempt to meet QoS requirements and to apply appropriate fairness schemes when scheduling resources for multiple UE bearers. In case a UE bearer has to meet stringent QoS requirements, it can be 1:1 mapped to a BH RLC channel. Since the BH RLC channel is configurable with the UE-bearer's QoS profile, the scheduler can enforce the necessary QoS requirements. When it comes to N:1 bearer mapping where several UE bearers are mapped to the same BH RLC channel, the intermediate JAB nodes' schedulers need to take into consideration, among other things, the number of UE bearers carried on each BH RLC channel to fairly share its resources among the multiple UE-bearers carried on their backhaul links. However, existing 3GPP spec (i.e., Rel16) does not provide any mechanism by which the JAB node scheduler can acquire this information.

SUMMARY

Certain aspects of the present disclosure and their embodiments may provide solutions to these or other challenges. For example, proposed herein is a method that employs the BAP Path ID field to convey the number of UE-bearers mapped to a given BH RLC channel. This may enable the schedulers of the intermediate JAB nodes to be informed about the number of UE bearers that are being carried on their backhaul links and thus be able to apply fair scheduling that takes that into account.

According to certain embodiments, a method by a network node includes obtaining a number of paths between the network node and at least one JAB node. The network node determines a number of bearers associated with each path of the number of paths. For each path, the network node assigns a path identifier value based on at least one of the number of paths and the number of bearers associated with each path.

According to certain embodiments, a network node includes processing circuitry configured to obtain a number of paths between the network node and at least one JAB node and determine a number of bearers associated with each path of the number of paths. For each path, the processing circuitry is configured to assign a path identifier value based on the number of paths and the number of bearers associated with each path.

According to certain embodiments, a method by a first network node includes receiving, from a second network node, a packet including a header. The header includes a path identifier value. Based on the path identifier value, the first network node determines a plurality of bearers associated with the path. Based on the plurality of bearers associated with the path, the first network node assigns at least one resource to the packet. The first network node transmits the packet to a third network node based on the at least one resource.

According to certain embodiments, a first network node includes processing circuitry configured to receive, from a second network node, a packet including a header. The header includes a path identifier value. Based on the path identifier value, the processing circuitry is configured to determine a plurality of bearers associated with the path. Based on the plurality of bearers associated with the path, the processing circuitry is configured to assign at least one resource to the packet. The first network node transmits the packet to a third network node based on the at least one resource.

Certain embodiments may provide one or more technical advantage(s). For example, some embodiments may facilitate the JAB nodes schedulers to improve topology-wide fairness and congestion control. As another example, some embodiments may facilitate the JAB nodes to remap the BH RLC channels of a BH link with RLF to appropriate BH RLC channels (in terms of their QoS requirements) over alternative BH link. As another example, some embodiments may use less signalling overhead or even no signaling is required for some network scenarios (i.e., when there is a single path toward each JAB node in a network).

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
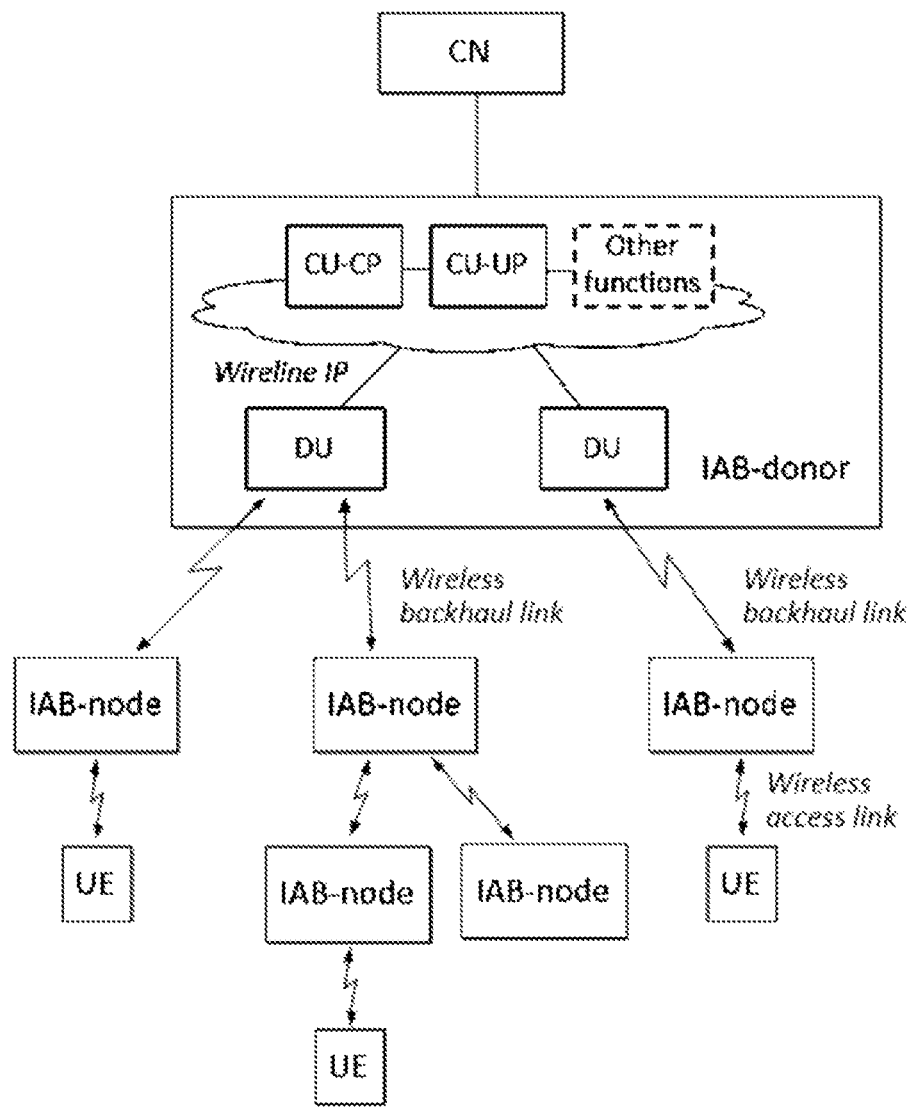
FIG. 1 illustrates a reference diagram for JAB in stand-alone mode, which contains one IAB-donor and multiple IAB-nodes.
Figure 2:
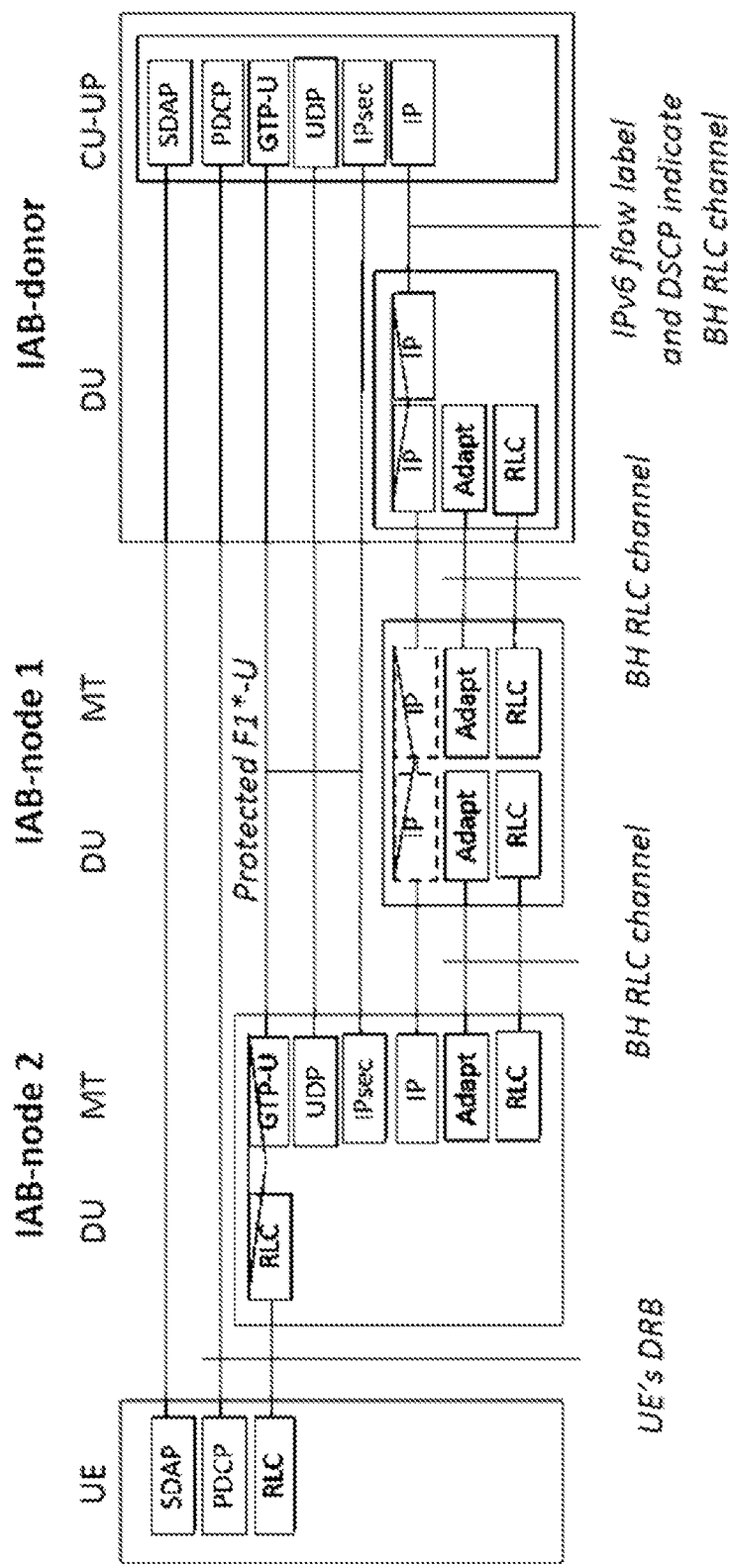
FIG. 2 illustrates the baseline user plane protocol stacks for IAB.
Figure 3A:
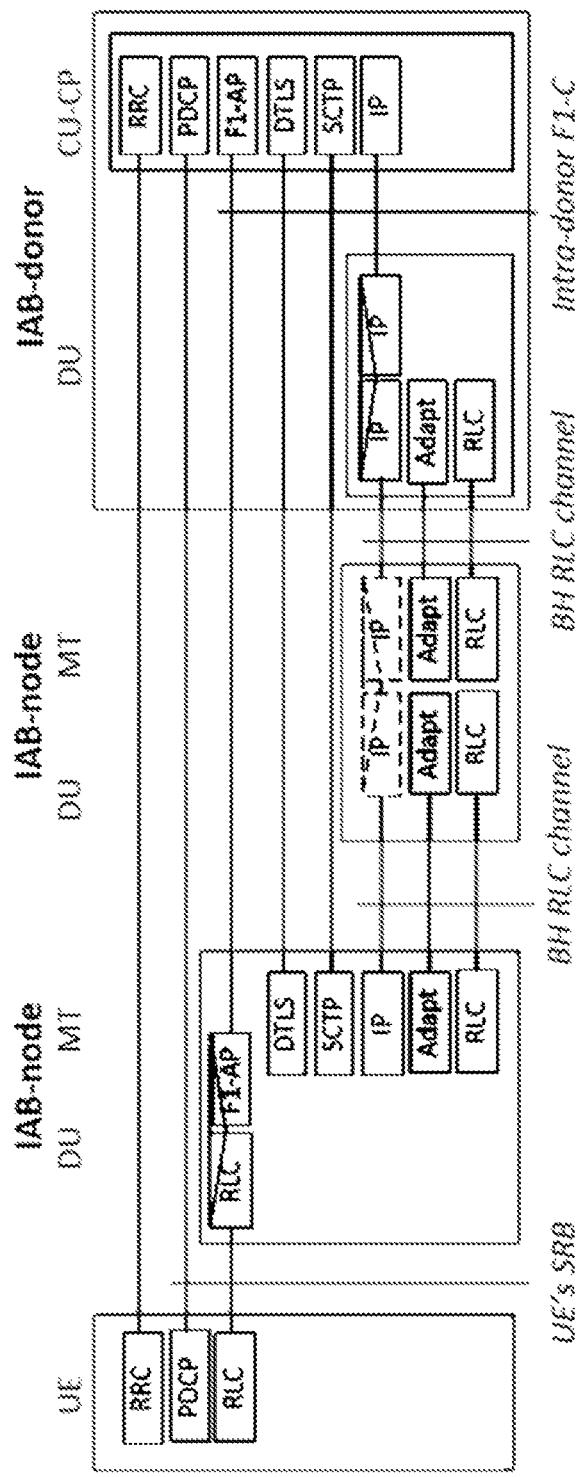
FIGS. 3A, 3B, and 3C illustrate the baseline control plane protocol stacks for IAB.
Figure 3B:
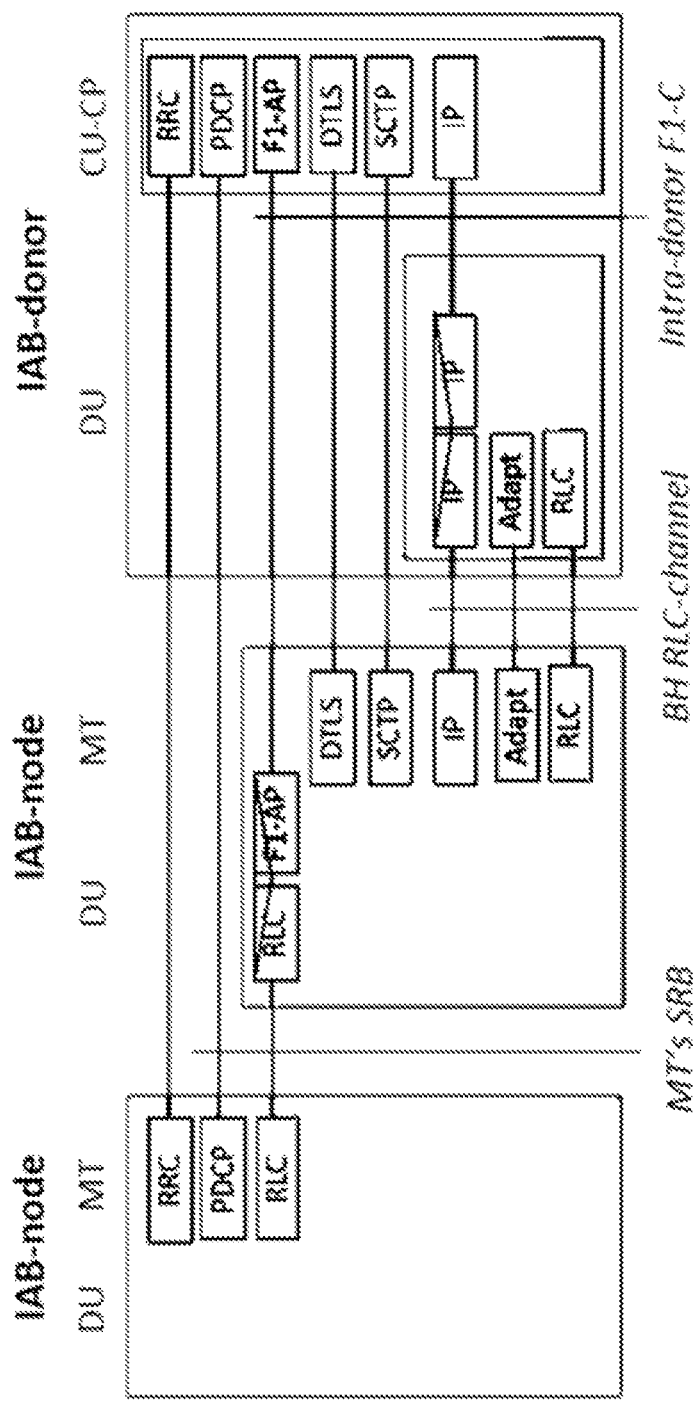
Figure 3C:
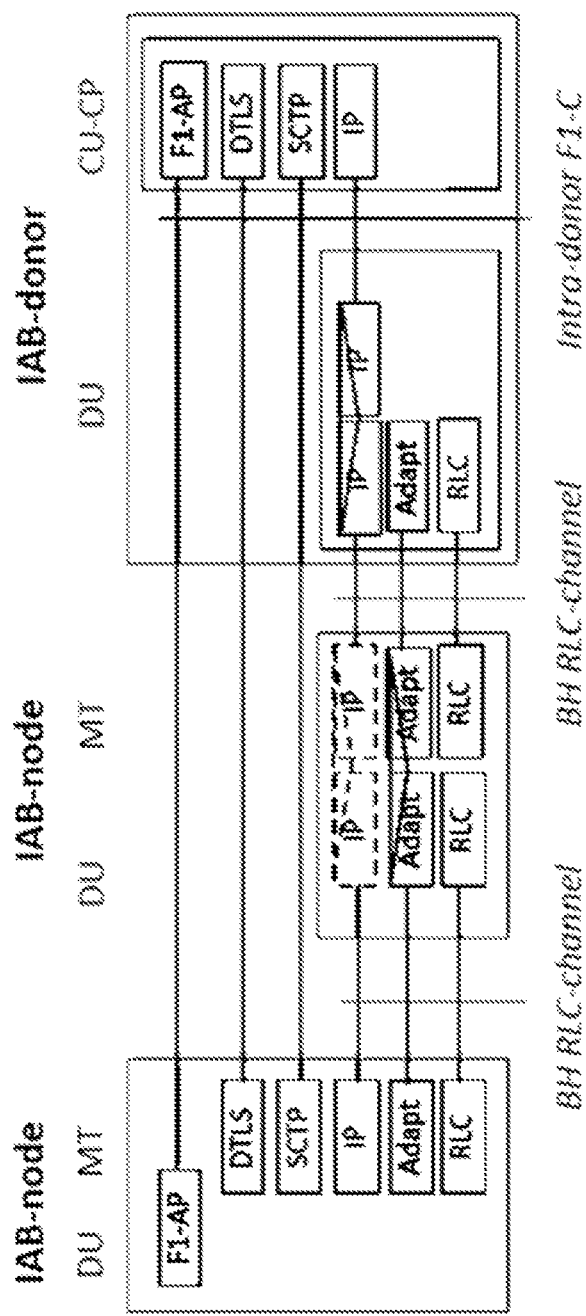
Figure 4:
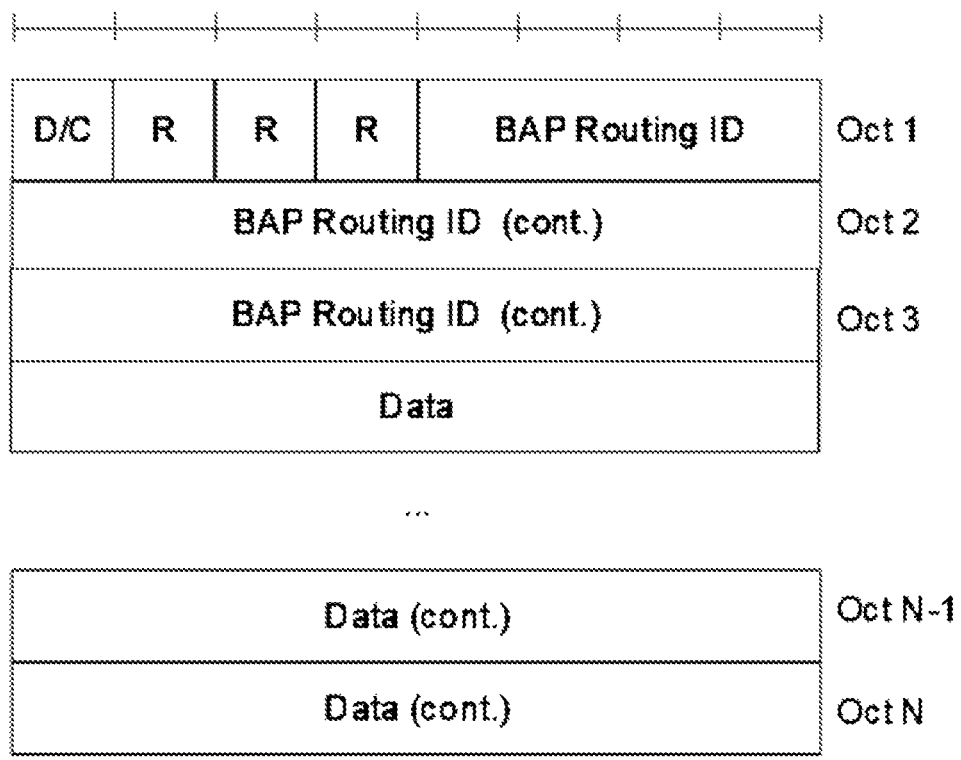
FIG. 4 a sample header for the data PDU.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore it is to be noted that the terms BAP address and BAP routing ID are used interchangeably. Similarly, the terms UE-bearer and UE DRB are used interchangeably.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

BAP Path ID Field for Communicating Additional Information

Disclosed herein, among other things, is a method at the JAB network level that utilizes the 10 bits BAP Path ID field in the BAP header for conveying additional information (apart from Path ID) such as the number of UE DRBs mapped to a particular BH RLC channel for N:1 mapping scenario. Some embodiments divide the BAP Path ID space into different intervals based on the maximum number of paths configured between the TAB-donor DU and an JAB node. According to certain and particular embodiments, these intervals can be of equal or unequal size depending on the network implementation.

According to certain embodiments, if there are K (suppose K=4) maximum paths between the IAB-donor DU and an JAB node, the BAP Path ID space could be divided into K intervals, where each interval having an address space of $(2^{10})/4=256$, first interval having the values 0 to 255, second interval having the values 256 to 511, third interval having the values 512 to 767, and fourth interval having the values 768 to 1023. That is, for any K, each path space has a length of $2^{10}/K$ (noted as p henceforth), and for each path k ($k \in \{0 \ldots K-1\}$), the range of possible values is between $p*k$ to $p*(k+1)-1$.

According to certain embodiments, within each interval, the path ID may be interpreted the same way from routing perspective (e.g. for the above example, any packet arriving at the intermediate JAB node with a path ID between 0 or 255 and having the same destination BAP address will be routed the same way, i.e. according to the routing configuration for the first path). However, the different values will give additional information as to how many bearers/UEs are terminated at the destination JAB node or at the respective ingress backhaul channel on which the packet is received. For example, path ID of 0 could be used to signify that only one UE bearer is terminated at the destination JAB node or the concerned BH channel, path ID of 1 could be used to signify that two bearers, etc. In one realization, instead of bearers, the numbers could signify the number of users, or some combination of the two.

Figure 5:
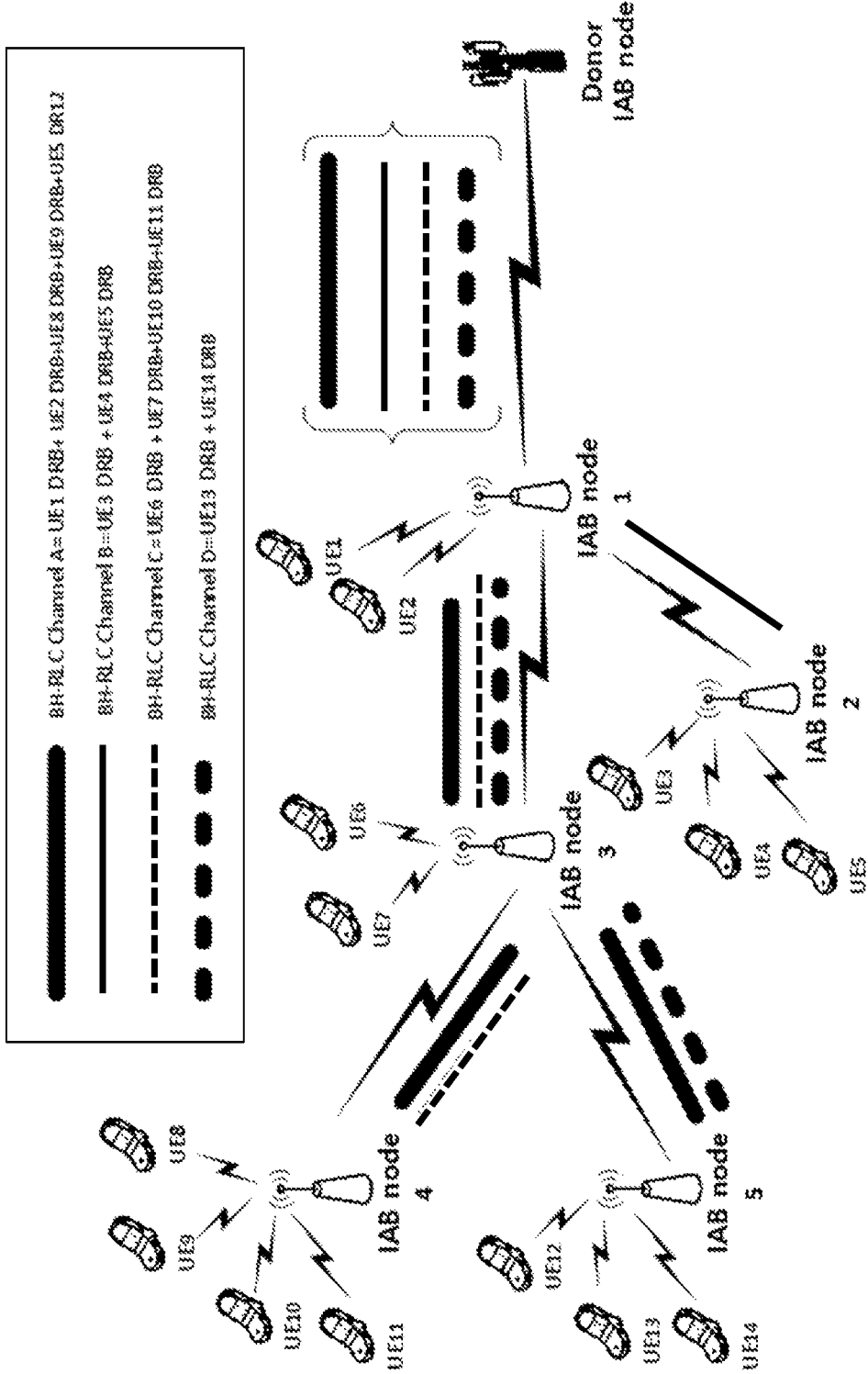
FIG. 5 an example of IAB network, according to certain embodiments.
Figure 6:
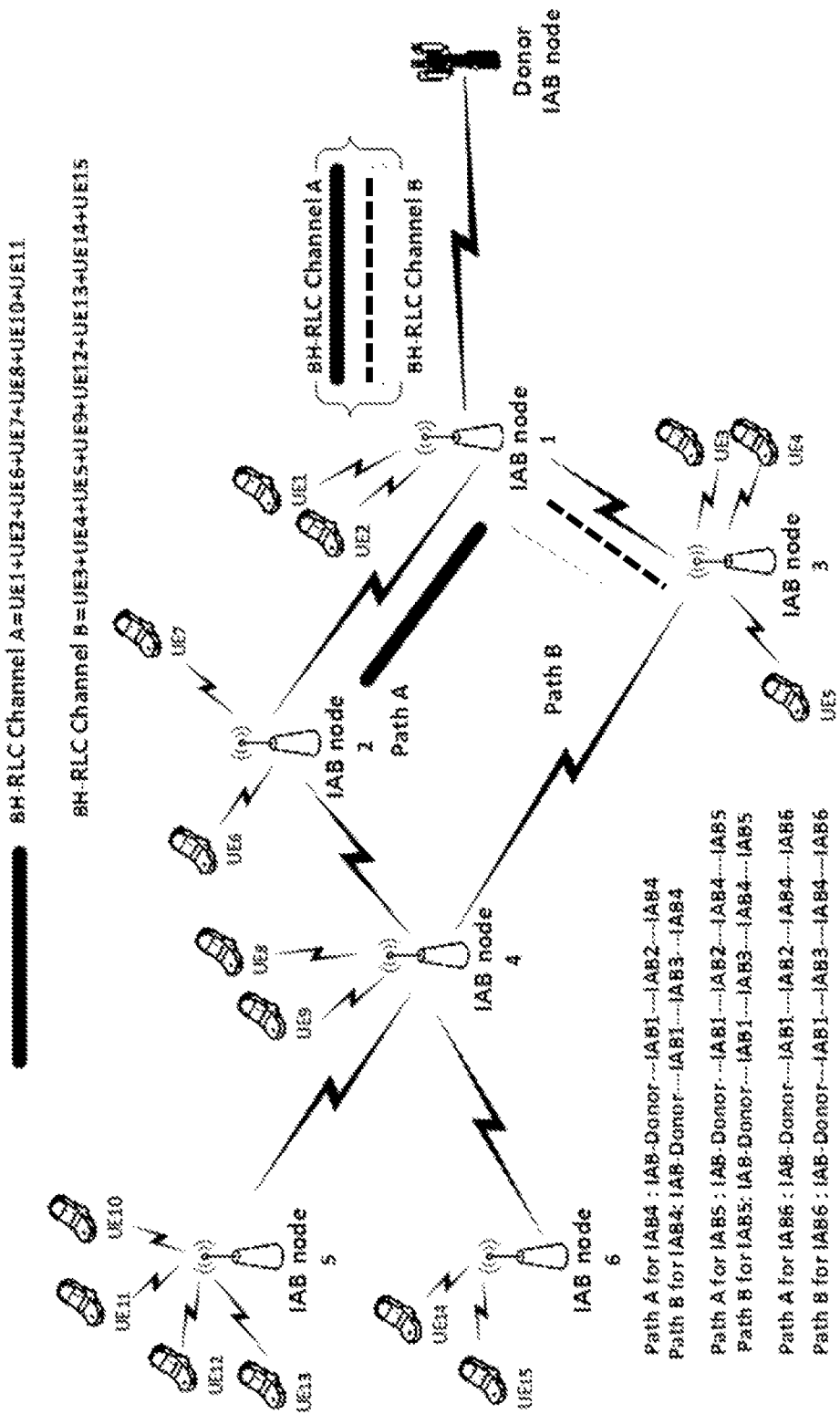
FIG. 6 another example of IAB network, according to certain embodiments.

FIG. 5 illustrates an example of an JAB network, according to certain embodiments. FIG. 6 illustrates another example of an JAB network, according to certain embodiments. More specifically, FIGS. 5 and 6 illustrate the DRBs of the UEs are mapped N:1 on the backhaul RLC channels. In FIG. 5, each JAB node can be accessed via the only actual path, while in FIG. 6, IAB node 4 can be accessed via two paths, path A (via IAB-Donor-IAB1-IAB2-IAB4) and path B (via IAB-Donor-IAB1-IAB3-IAB4).

Table-I shows how the mapping could be performed (for case FIG. 5) in the BAP layer of the IAB-donor node. Assume that based on the information in the IP address fields (i.e., DS/DSCP) of the F1-AP signaling received from the IAB-donor CU (which is based on the QoS requirements of each bearer, as it is reasonable to assume that bearers having a similar QoS requirements are mapped to the same BH RLC channel that is configured to suit the QoS requirements of those bearers), the IAB-donor DU maps the DRBs of UE1, UE2, UE8, UE9, and U12 to BH RLC channel A on its egress BH link with JAB node 1. Similarly, DRBs of UE3, UE4, and UE5 are mapped to BH RLC channel B, while DRBs of UE6, UE7, UE10, and UE11 are mapped to BH RLC channel C. Finally, DRBs of UE12, UE13, and UE14 are mapped to BH RLC channel D.

According to certain embodiments, to indicate the information (i.e., BH RLC channel sharing among UE DRBs) to the downstream JAB nodes, the IAB-donor DU will increment the BAP Path ID values by the number of DRBs sharing a particular BH RLC channel. For example, the BH RLC channel A between the donor node and JAB node 1 is used to transport 5 bearers (for UE1, UE2, UE8, UE9 and UE12), the BH RLC channel A between JAB node 1 and JAB node 2 is used to transport 3 bearers (for UE8, UE9 and UE12), and so on. Since there is only path for each JAB node, any value between 0 to 1023 could be used for the path ID without causing routing issues in intermediate JAB nodes (as the destination BAP address will uniquely determine where the packets should be routed). In the example scenario, the IAB-donor assigns the BAP Path ID value of 5 to the packets that it is mapping to the BH RLC channel A (i.e. equal to the number of bearers that are multiplexed over this BH RLC channel) as shown in the table. Similarly, for the other BH RLC channels between the donor and JAB node 1, the path ID values of 3, 4 and 2 corresponding to the number of bearers mapped over them.

When intermediate JAB nodes get packets, the packets are either destined to them (i.e. UEs they are serving or traffic to the JAB node) or to be forwarded to another JAB node. Since the intermediate JAB node knows how many bearers it terminates and how many of those are carried over the ingress backhaul channel, it could modify the path ID before forwarding the packet to the next node, accounting for the number of bearers that it is terminating. For example, when JAB node 1 gets a packet that is destined to TAB4 or IAB5 over the backhaul RLC channel A (which will have a path ID of 5), it knows that over the next hop(s), the packet will be carried with 2 other bearers (i.e. five total bearers over the ingress BH RLC channel, two are terminated at JAB node 1, three must go over the next hop that is associated with destination BAP address for IAB4 or IAB5). Thus, it updates the BAP Path ID values for the packets that it is forwarding to JAB node 3 to 3. However, for packets that are received via the BH RLC channel B (which carriers only the traffic of bearers terminated at IAB4), since none of them are terminated at IAB1, no path ID will be made by JAB node 1 on forwarding this packet. The same for the traffic of packets coming on the BH RLC channels C and D between the donor and JAB node 1. Thus, the DU side of JAB node 1 will then have packets that have the following path IDs (for the link between IAB1 and IAB3):3 for the first BH RLC channel (corresponding to bearers of UE8, 9 and 12), 4 for the next RLC channel (corresponding to bearers of UE6, 7, 10, 11) and 2 (corresponding to bearers of UE13, 14). Thus, it can use this information to schedule the packets in a fair way. For example, the QoS settings of the BH RLC channel C that is carrying only 2 bearers could be higher than that of the BH RLC channel B that is carrying 4 bearers. If only the QoS setting will be used for prioritizing the scheduling of the traffic, more users may experience more latency. Thus, one example implementation could be to scale up/down the scheduling priorities among the different backhaul RLC channels depending on the number of bearers (or UEs) that are multiplexed over the backhaul RLC channel (in addition to the QoS settings of the BH RLC channels).

According to certain embodiments, the hop count may be communicated using known methods or using the BAP address for the hop count. The hop counts a packet has to transverse can be either implicitly or explicitly become available at intermediate JAB node. Such information can be used on top of the number of bearers as well. For example, even though there may be several bearers multiplexed over a given BH RLC channel, if most of these bearers are just terminated at the next JAB node, it can be assigned a lower scheduling priority than a channel that has few bearers multiplexed over it, but the bearers of which are terminated several hops away. In general, one could describe the scheduler at the intermediate JAB node to employ a scheduling algorithm that tries to achieve fairness when scheduling data that belong to different BH RLC channels by considering one or more of the following:

The number of UEs that are mapped over each BH RLC channel

The number of bearers that are mapped over each BH RLC channel

How many hops the data belonging to each bearer/BH RLC channel has to traverse before it reaches the destination A similar update of the path IDs could be made at each intermediate JAB node (i.e. each JAB node subtracting the number of bearers it is terminating from the path ID of the ingress BH RLC channel).

TABLE I

Routing and Bearer mapping configuration in the IAB-donor node for FIG. 5

| UE DRBs | Destination Node IP Address | DS/DSCP Value | BAP Address | BH RLC Channel | BAP Path ID |
|---------|-----------------------------|---------------|-------------|----------------|-------------|
| UE1 DRB | IAB1 | D1 | BAP1 | BH-CH-A | Path ID 5 |
| UE2 DRB | IAB1 | D1 | BAP1 | BH-CH-A | Path ID 5 |
| UE3 DRB | IAB2 | D2 | BAP2 | BH-CH-B | Path ID 3 |
| UE4 DRB | IAB2 | D2 | BAP2 | BH-CH-B | Path ID 3 |
| UE5 DRB | IAB2 | D2 | BAP2 | BH-CH-B | Path ID 3 |
| UE6 DRB | IAB3 | D3 | BAP3 | BH-CH-C | Path ID 4 |
| UE7 DRB | IAB3 | D3 | BAP3 | BH-CH-C | Path ID 4 |
| UE8 DRB | IAB4 | D1 | BAP4 | BH-CH-A | Path ID 5 |
| UE9 DRB | IAB4 | D1 | BAP4 | BH-CH-A | Path ID 5 |
| UE10 DRB | IAB4 | D3 | BAP4 | BH-CH-C | Path ID 4 |
| UE11 DRB | IAB4 | D3 | BAP4 | BH-CH-C | Path ID 4 |
| UE12 DRB | IAB5 | D1 | BAP5 | BH-CH-A | Path ID 5 |
| UE13 DRB | IAB5 | D4 | BAP5 | BH-CH-D | Path ID 2 |
| UE14 DRB | IAB5 | D4 | BAP5 | BH-CH-D | Path ID 2 |

For the case of FIG. 6, since we have two possible paths for JAB node 4, JAB node 5 and JAB node 6, we could divide the path ID space into partitions, i.e. 0 to 511 for the first path (called path A) and 512 to 1023 for the second path (called path B). Table II shows how the mapping could be performed (for case FIG. 6) in the BAP layer of the IAB-donor node. Here the UE8 DRB of JAB node 4 is mapped to BH RLC channel A over Path A from the IAB-donor node, while UE9 DRB of JAB node 4 is mapped to BH RLC channel B over Path B. Since UE 8 DRB is mapped to BH RLC channel A (on Path A) that transport a total of 7 UE DRBs (i.e., UE1, UE2, UE6, UE7, UE8, UE10, and UE11), hence the Path ID for UE8 DRRB is set to 7 (i.e., Path ID 0+7). Similarly, for the UE9 DRB, the Path ID is set to 519 (i.e., Path ID 512+7) as it is mapped to a BH RLC channel (i.e., BH RLC channel B) on Path B, and that BH RLC channel transports a total of 8 UE DRBs (i.e., UE3, UE4, UE5, UE9, UE12, UE13, UE14, and UE15). Similarly, UE10 DRB and UE 11 DRB served by JAB node 5 are mapped to BH RLC Channel A on the Path A, while UE12 DRB and UE12 DRB served by the same JAB node (i.e., JAB node 5) are mapped to BH RLC channel B over the Path B. Therefore, the BAP Path ID of the BAP PDU for these DRBs are set according to the path and number of DRBs sharing the BH RLC channels, as can be seen in Table-II below.

TABLE II

Routing and Bearer mapping configuration in the IAB-donor node for FIG. 6

| UE DRBs | Destination Node IP Address | DS/DSCP Value | BAP Address | BH RLC Channel | BAP Path ID |
|---------|-----------------------------|---------------|-------------|----------------|-------------|
| UE1 DRB | IAB1 | D1 | BAP1 | BH-CH-A | Path ID 7 |
| UE2 DRB | IAB1 | D1 | BAP1 | BH-CH-A | Path ID 7 |
| UE3 DRB | IAB3 | D2 | BAP3 | BH-CH-B | Path ID 8 |
| UE4 DRB | IAB3 | D2 | BAP3 | BH-CH-B | Path ID 8 |
| UE5 DRB | IAB3 | D2 | BAP3 | BH-CH-B | Path ID 8 |
| UE6 DRB | IAB2 | D1 | BAP2 | BH-CH-A | Path ID 7 |
| UE7 DRB | IAB2 | D1 | BAP2 | BH-CH-A | Path ID 7 |
| UE8 DRB | IAB4 | D1 | BAP4 | BH-CH-A | Path ID 7 |
| UE9 DRB | IAB4 | D2 | BAP4 | BH-CH-B | Path ID 519 |
| UE10 DRB | IAB5 | D1 | BAP5 | BH-CH-A | Path ID 7 |
| UE11 DRB | IAB5 | D1 | BAP5 | BH-CH-A | Path ID 7 |
| UE12 DRB | IAB5 | D2 | BAP5 | BH-CH-B | Path ID 519 |
| UE13 DRB | IAB5 | D2 | BAP5 | BH-CH-B | Path ID 519 |
| UE14 DRB | IAB6 | D2 | BAP6 | BH-CH-B | Path ID 520 |
| UE15 DRB | IAB6 | D2 | BAP6 | BH-CH-B | Path ID 520 |

In some embodiments, the IAB-donor DU will increment the BAP Path ID by considering both the BAP address and the assigned/mapped BH RLC channel. For example, UE1 and UE2 DRBs of IAB node 1 are mapped to BH RLC channel A, so, the BAP Path ID of packets carrying traffic for these DRBs will be incremented by 2 (i.e., BAP Path ID will set to 2 as shown in Table III below). Similarly, the BAP Path ID of UE8 and UE9 DRBs of IAB node 4 mapped to BH RLC channel A will be set to 2, while the BAP Path ID of UE12 DRB of IAB node 5 mapped to BH RLC channel A will be set to 1. In this sub-case, the intermediate IAB nodes will keep track of the number of UE DRBs mapped to a BH RLC channel by examining the BAP Path ID values for different BAP addresses mapped to a BH RLC channel. For instance, the IAB node 1 (in FIG. 5) when receives packets with BAP address BAP4-BAP Path ID 2 and BAP address BAP5-BAP Path ID 1 on the ingress BH RLC channel A will know that its egress BH RLC channel A will be shared by a total of 3 UE DRBs and so can provide an appropriate QoS treatment while scheduling the traffic on its egress BH link.

TABLE III

Routing and Bearer mapping configuration in the IAB-donor node for FIG. 5

| UE DRBs | Destination Node IP Address | DS/DSCP Value | BAP Address | BH RLC Channel | BAP Path ID |
|---------|-----------------------------|---------------|-------------|----------------|-------------|
| UE1 DRB | IAB1 | D1 | BAP1 | BH-CH-A | Path ID 2 |
| UE2 DRB | IAB1 | D1 | BAP1 | BH-CH-A | Path ID 2 |

TABLE III-continued

Routing and Bearer mapping configuration
in the IAB-donor node for FIG. 5

| UE DRBs | Destination Node IP Address | DS/DSCP Value | BAP Address | BH RLC Channel | BAP Path ID |
|---|---|---|---|---|---|
| UE3 DRB | IAB2 | D2 | BAP2 | BH-CH-B | Path ID 3 |
| UE4 DRB | IAB2 | D2 | BAP2 | BH-CH-B | Path ID 3 |
| UE5 DRB | IAB2 | D2 | BAP2 | BH-CH-B | Path ID 3 |
| UE6 DRB | IAB3 | D3 | BAP3 | BH-CH-C | Path ID 2 |
| UE7 DRB | IAB3 | D3 | BAP3 | BH-CH-C | Path ID 2 |
| UE8 DRB | IAB4 | D1 | BAP4 | BH-CH-A | Path ID 2 |
| UE9 DRB | IAB4 | D1 | BAP4 | BH-CH-A | Path ID 2 |
| UE10 DRB | IAB4 | D3 | BAP4 | BH-CH-C | Path ID 2 |
| UE11 DRB | IAB4 | D3 | BAP4 | BH-CH-C | Path ID 2 |
| UE12 DRB | IAB5 | D1 | BAP5 | BH-CH-A | Path ID 1 |
| UE13 DRB | IAB5 | D4 | BAP5 | BH-CH-D | Path ID 2 |
| UE14 DRB | IAB5 | D4 | BAP5 | BH-CH-D | Path ID 2 |

Note that in the method described above a maximum number of 1024 UE DRBs can be mapped to a BH RLC channel for a network with single paths to JAB nodes and for a maximum number of 512 UE DRBs mapped to a BH RLC channel for network with two paths to JAB nodes, and so on. However, if there are more than 1024 UE DRBs mapped to a BH RLC channel, in that case, an increment by 1 in the BAP Path ID will indicate more than one UE DRB (depending on the maximum number of UE DRBs mapped to a BH RLC channel. For instance, for 2048 UE DRBs mapped to a BH RLC channel, an increment by 1 in the BAP Path ID will indicate 2 UE DRBs, and so on) mapped to a BH RLC channel. The same procedure also applies to the method described in the sub-embodiment of the IVD.

In some embodiments, since this mapped will be performed at the IAB-donor DU, the DU needs to know about the number of available or configured paths so that to adjust its mapping procedure. The IAB-donor CU will provide such information to the DU. Furthermore, in case the IAB-donor DU uses an increment of 1 in the BAP Path ID for indicating more than one UE DRB mapped to a BH RLC channel, then the intermediate JAB nodes should be informed about this enabling them to decrement the BAP Path ID accordingly for the UE DRBs that terminate at the intermediate JAB nodes. The intermediate JAB nodes can be informed via IAB-donor CU or via OAM. These intermediate JAB nodes can be informed only when an increment of 1 in the BAP Path ID indicates more than one UE DRBs and not for the default case, i.e., when an increment of 1 in the BAP Path ID indicates only one UE DRB. Or the intermediate JAB nodes can be informed for all the cases.

Figure 7:
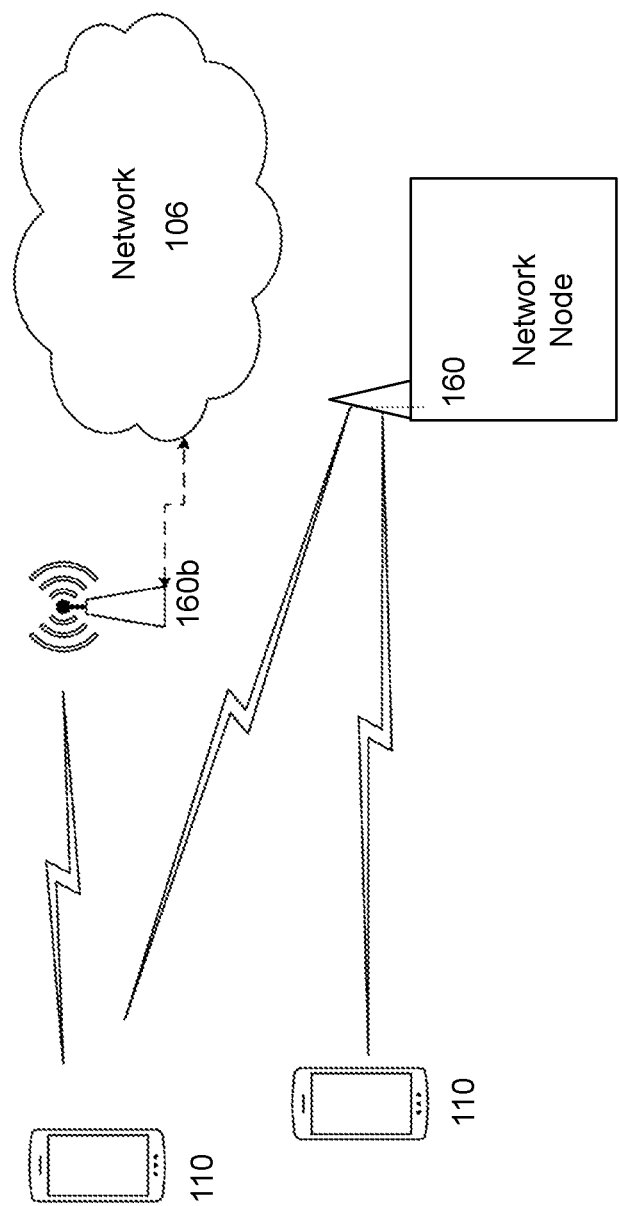
FIG. 7 illustrates an example wireless network, according to certain embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 106, network nodes 160 and 160b, and wireless devices (WDs) 110. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 8:
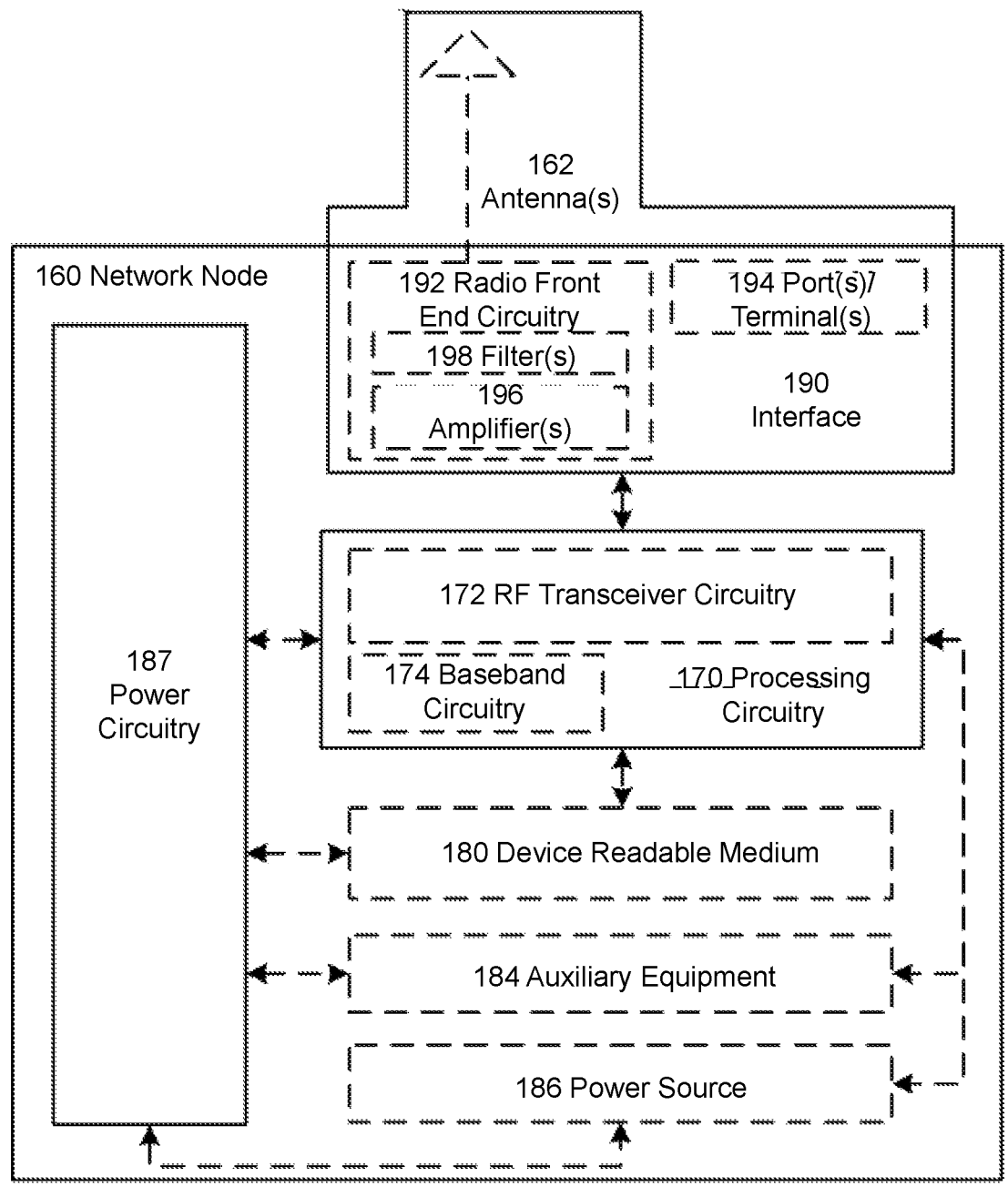
FIG. 8 illustrates an example network node, according to certain embodiments.

FIG. 8 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NRNodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entitys (MMEs)), Operations & Maintenance (O&M) nodes, Operation Support System (OSS) nodes, Self Optimized Network (SON) nodes, positioning nodes (e.g., Evolved-Serving Mobile Location Centres (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 160 includes processing circuitry 170, device readable medium 180, interface 190, auxiliary equipment 184, power source 186, power circuitry 187, and antenna 162. Although network node 160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination. Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 8 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 9:
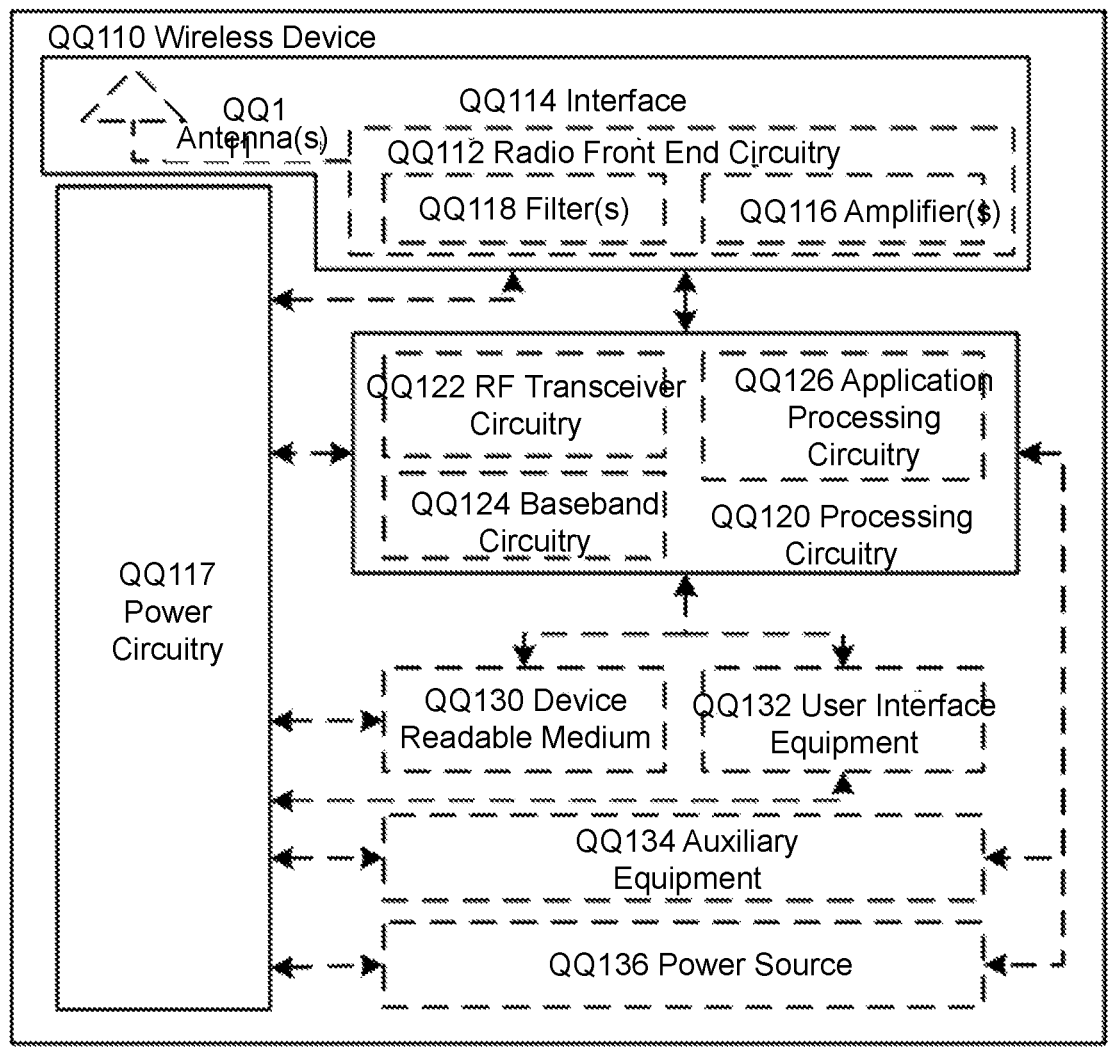
FIG. 9 illustrates an example wireless device, according to certain embodiments.

FIG. 9 illustrates an example wireless device (WD), according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 10:
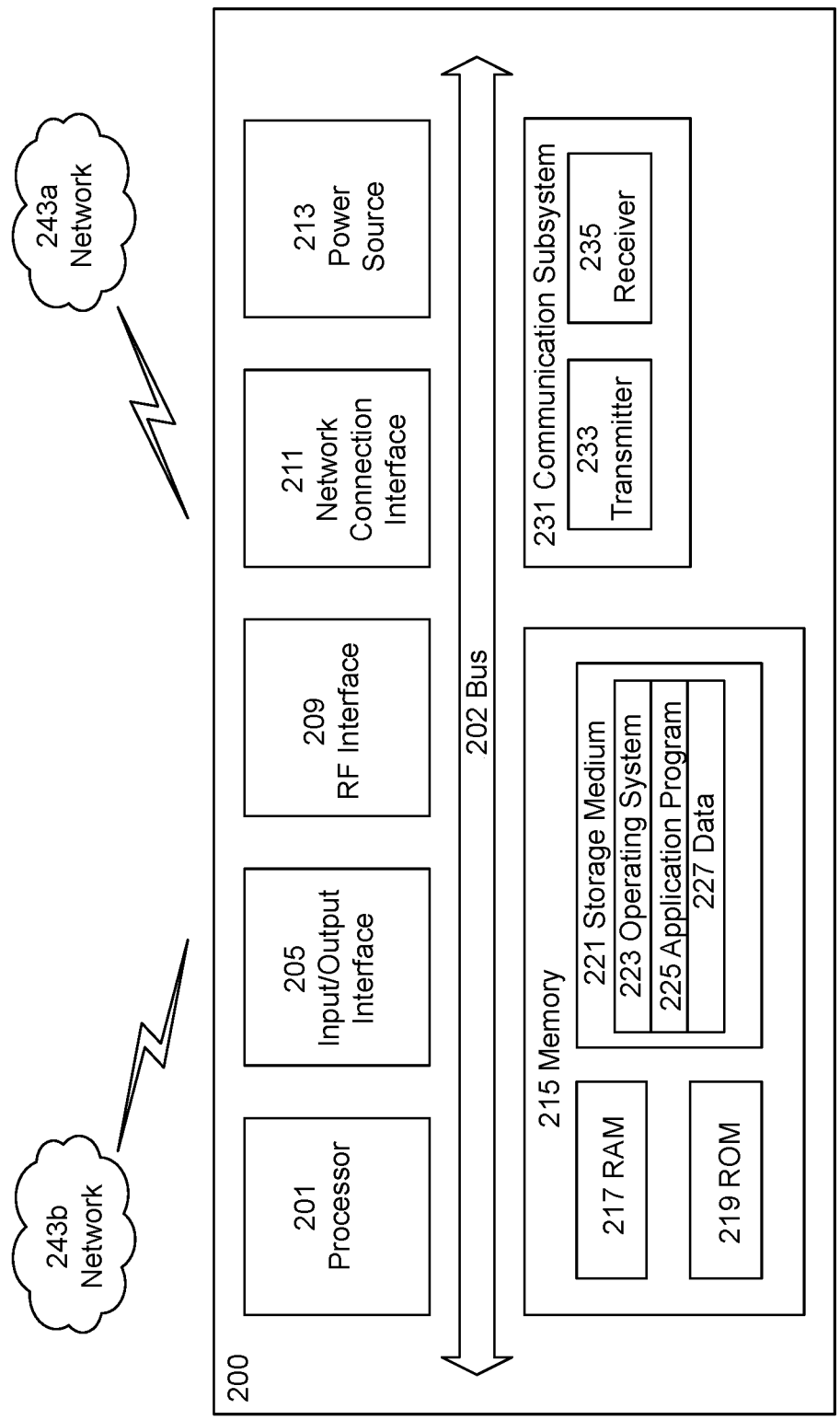
FIG. 10 illustrate an example user equipment, according to certain embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 10, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 10, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.11, Code Division Multiplexing Access (CDMA), Wide Code Division Multiplexing Access (WCDMA), GSM, LTE, Universal Terrestrial Radio Access Network (UTRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 11:
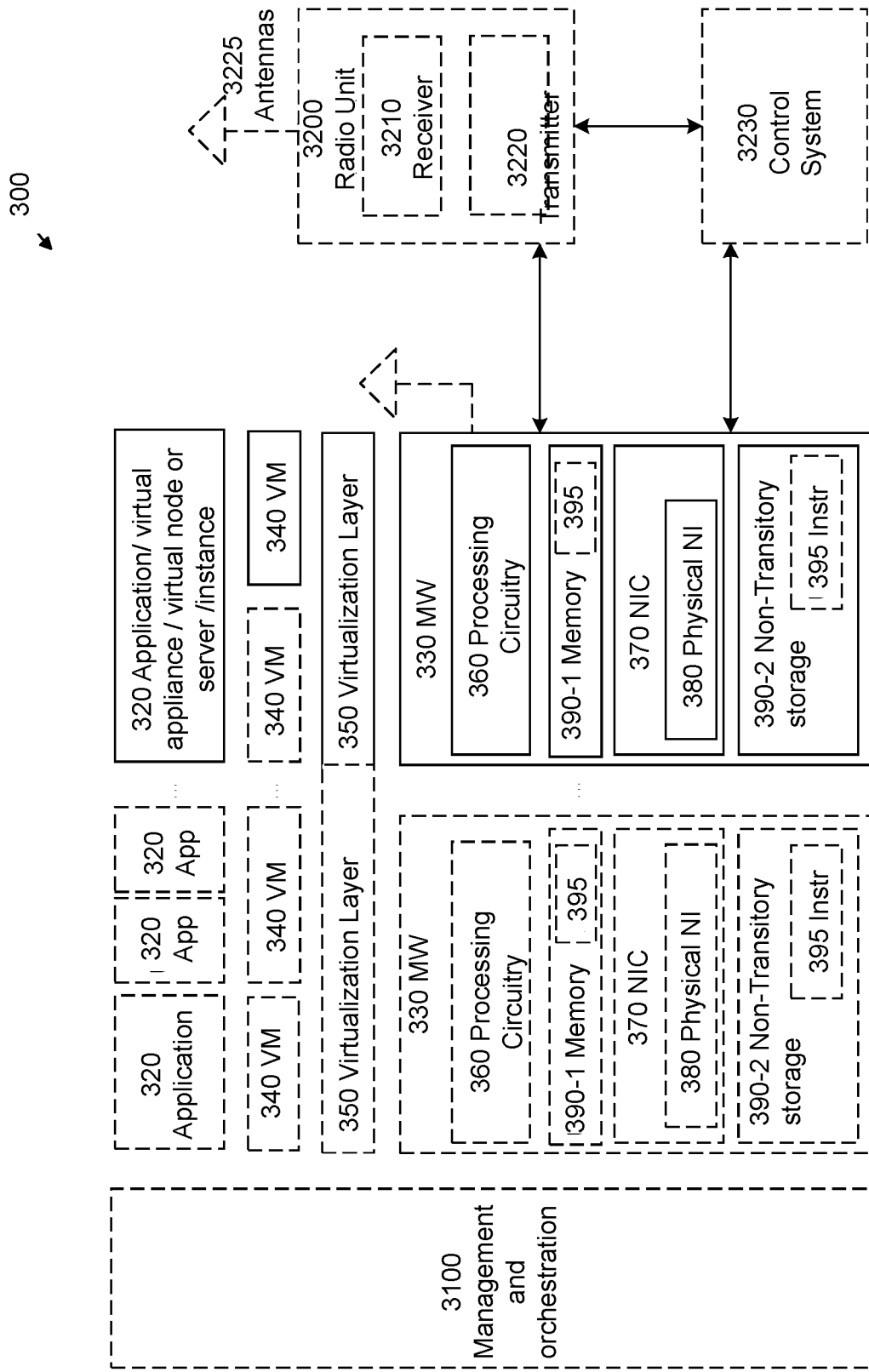
FIG. 11 illustrates a virtualization environment in which functions implemented by some embodiments may be virtualized, according to certain embodiments.

FIG. 11 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 11, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 11.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 12:
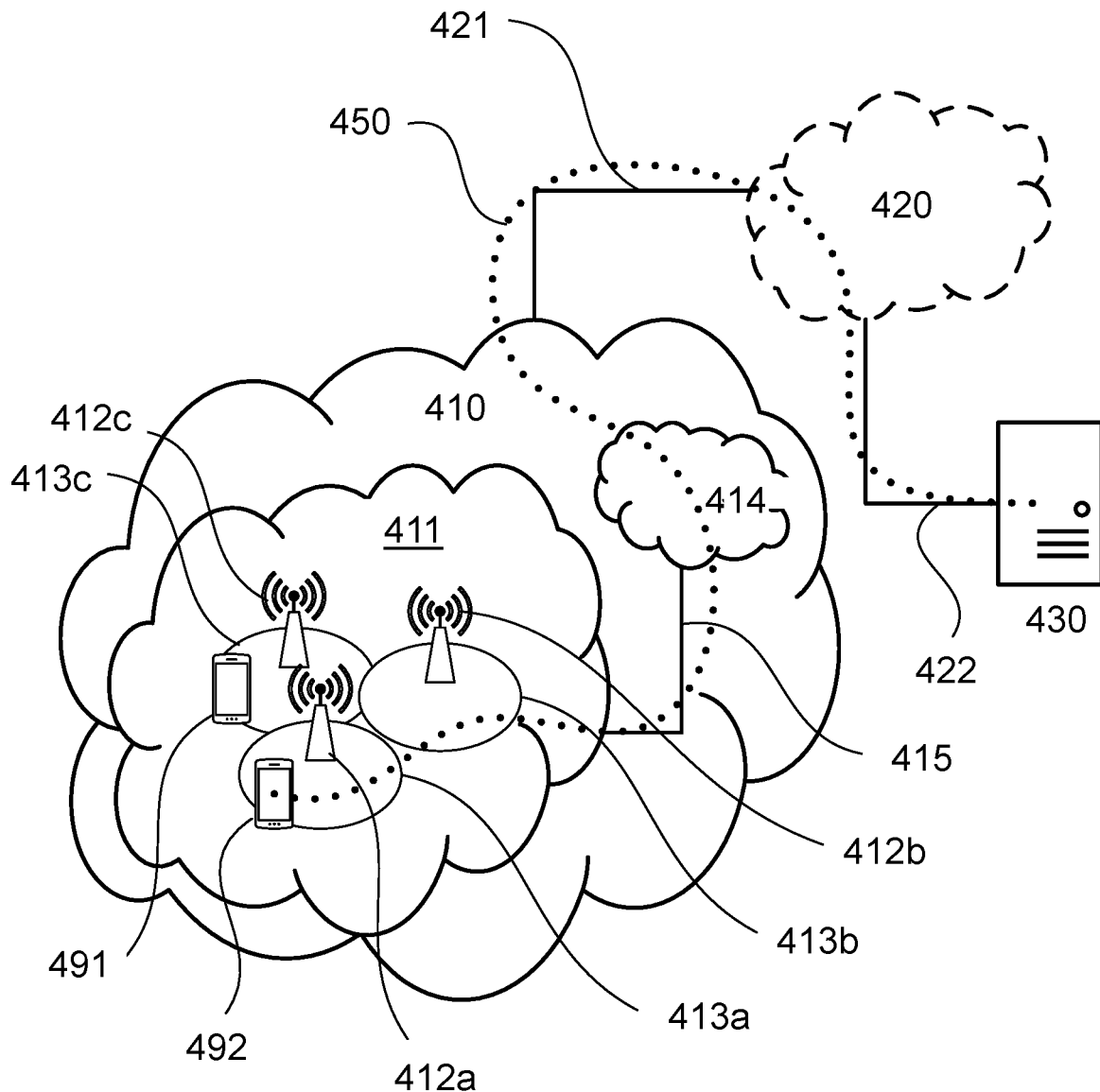
FIG. 12 illustrates a telecommunication network connected via an intermediate network to a host computer, according to certain embodiments.

FIG. 12 illustrates a telecommunication network connected via an intermediate network to a host computer, according to certain embodiments.

With reference to FIG. 12, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 12 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 13:
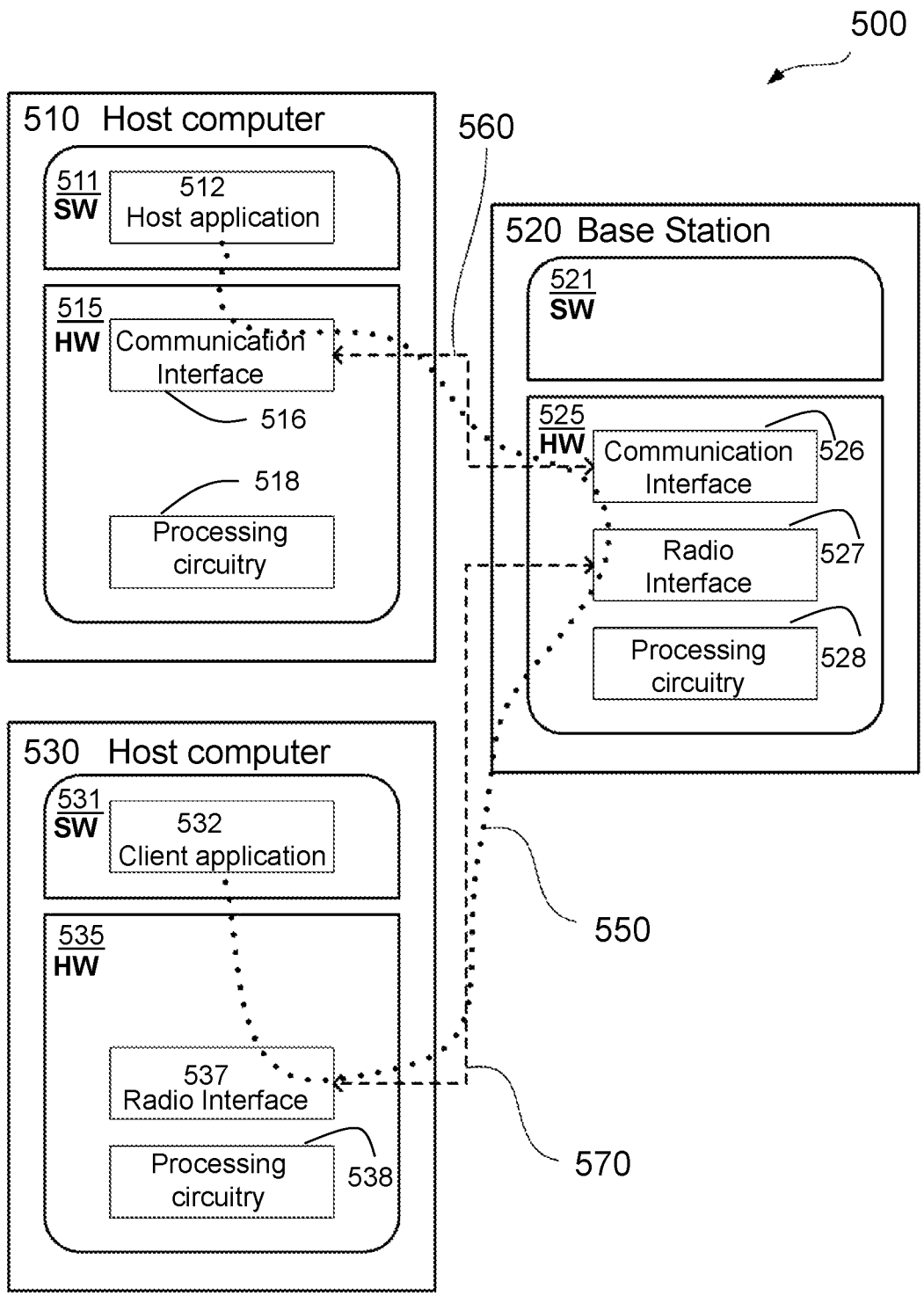
FIG. 13 illustrates a generalized block diagram of a host computer communicating via a base station with a user equipment over a partially wireless connection, according to certain embodiments.

FIG. 13 illustrates a host computer communicating via a base station with a user equipment over a partially wireless connection, according to certain embodiments.

Example implementations, in accordance with an embodiment, of the UE, base station and host computer discussed in the preceding paragraphs will now be described with reference to FIG. 13. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 13) served by base station 520. Communication interface 526 may be configured to facilitate connection 560 to host computer 510. Connection 560 may be direct or it may pass through a core network (not shown in FIG. 13) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 13 may be similar or identical to host computer 430, one of base stations 412a, 412b, 412c and one of UEs 491, 492 of FIG. 12, respectively. This is to say, the inner workings of these entities may be as shown in FIG. 13 and independently, the surrounding network topology may be that of FIG. 12.

In FIG. 13, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the networks ability to allocate resources and thereby provide benefits such as more bandwidth where it is more needed. This may allow for more bandwidth being allocated to UEs that need it.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 14, 15:
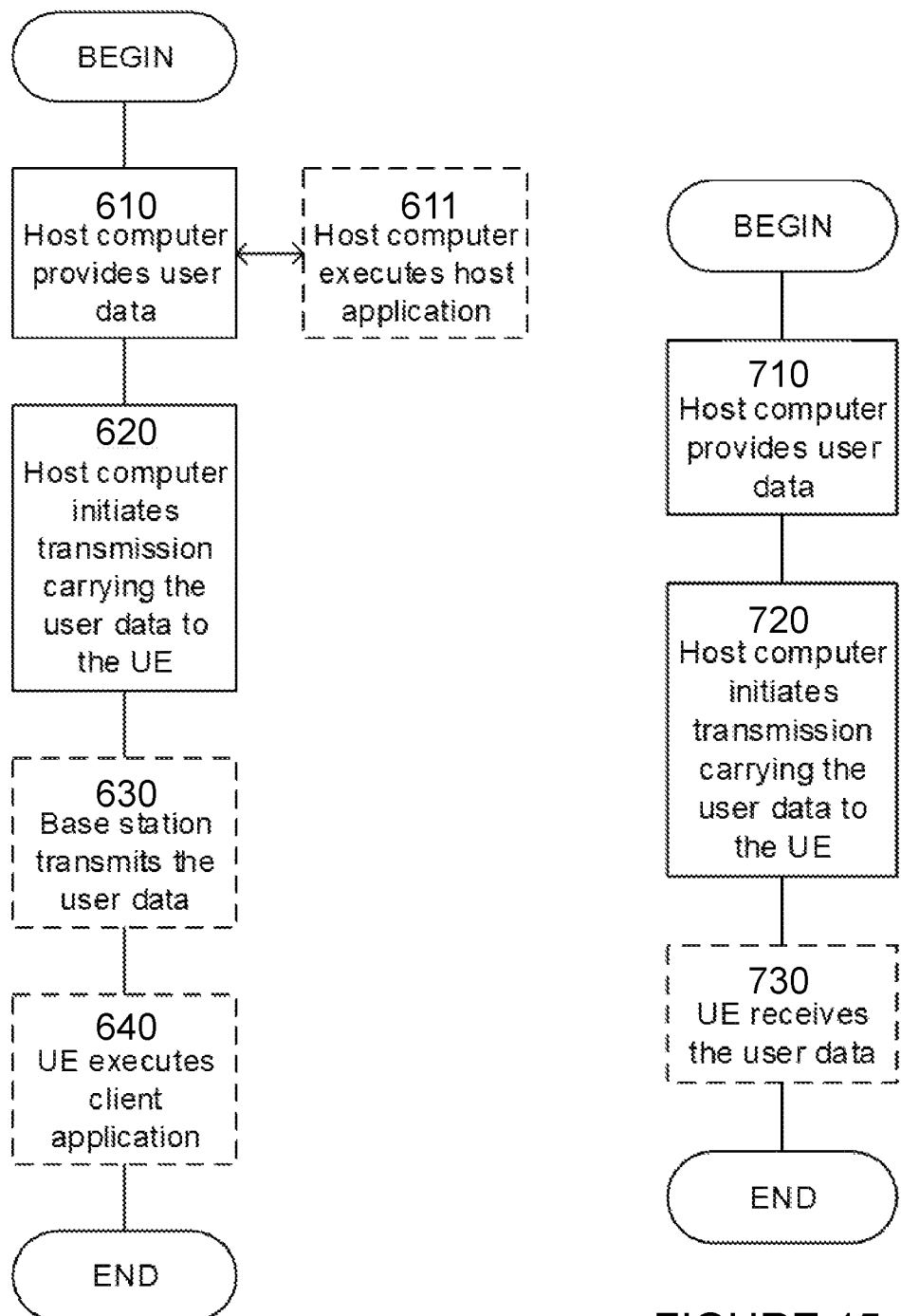
FIG. 14 illustrates a method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 16, 17:
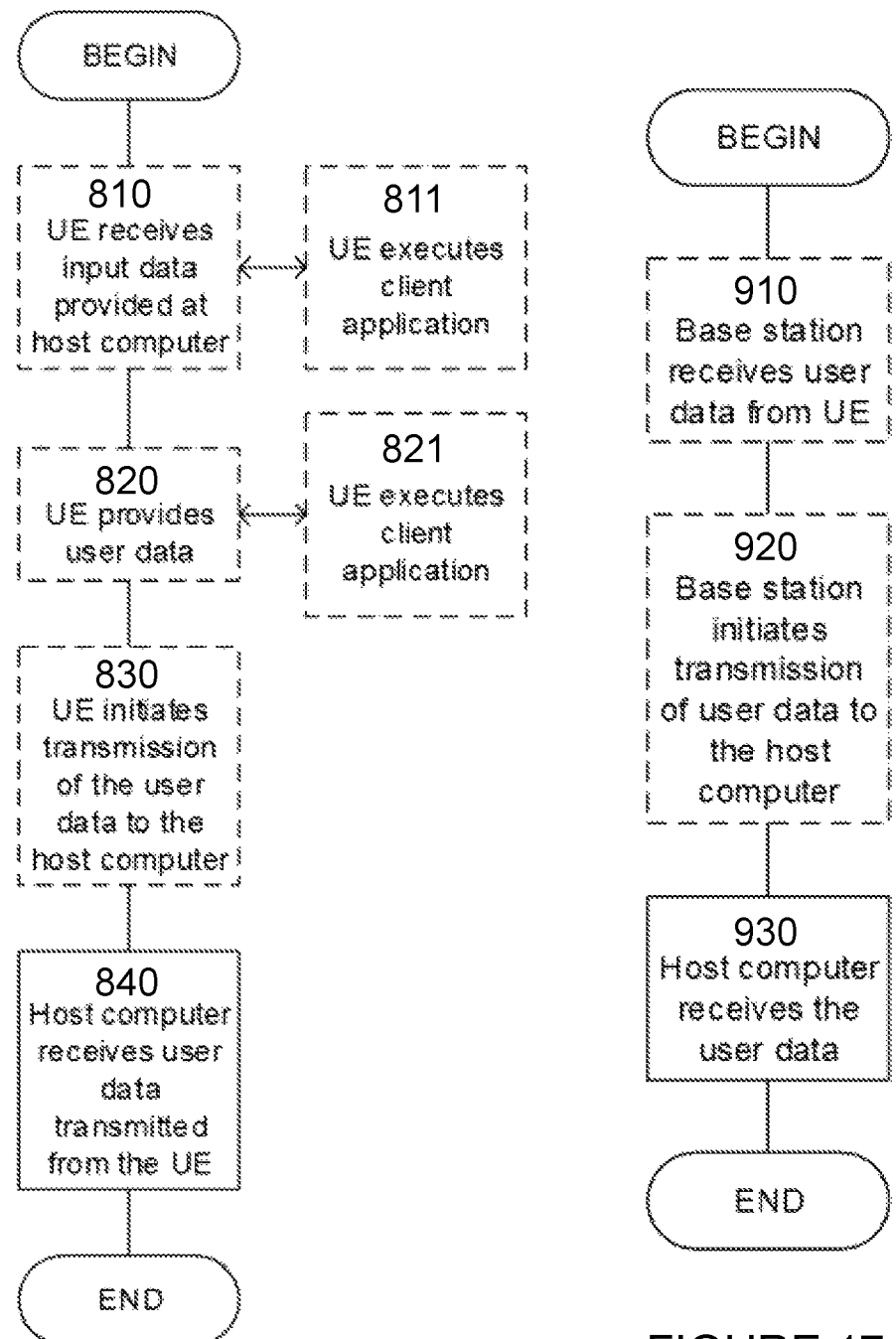
FIG. 16 illustrates another method implemented in a communication system, according to one embodiment.
FIG. 17 illustrates another method implemented in a communication system, according to one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 18:
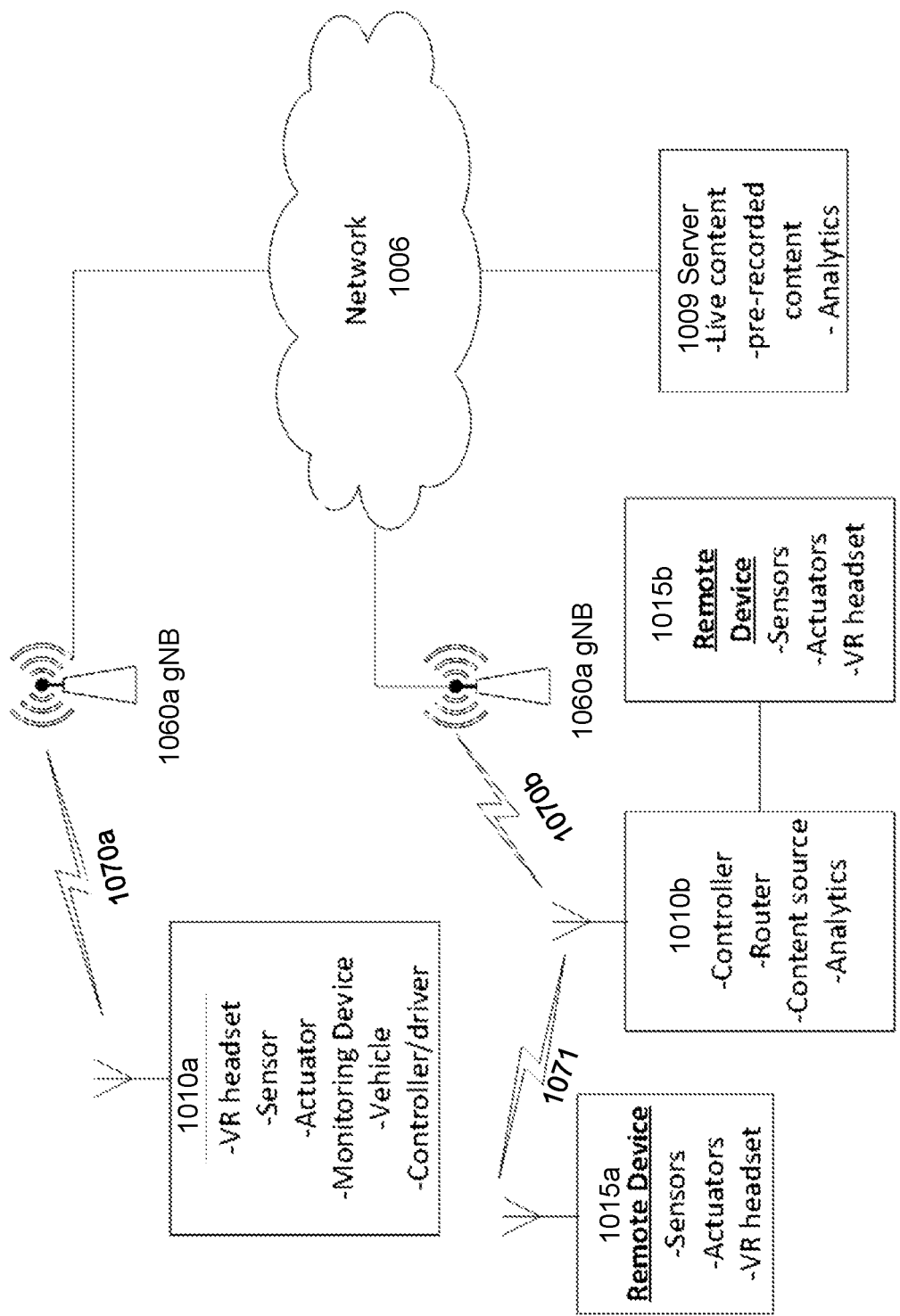
FIG. 18 illustrates a wireless network comprising different devices connected, either directly or indirectly, to the wireless network through one or more access network nodes, according to certain embodiments.

FIG. 18 depicts a wireless network comprising different devices connected, either directly or indirectly, to the wireless network through one or more access network nodes, such as gNBs 1060a and 1060b. In particular, the wireless network includes access network nodes such as gNBs 1060a and 1060b, UE 1010a, hub 1010b, remote devices 1015a and 1015b and server 1009. UE 1010a and hub 1010b may be any of a wide variety of devices capable of communicating wirelessly with gNBs 1060's. Although hub 1010b is referred to as a hub, it may also be considered a UE (with hub functionality) because it is able to communicate wirelessly with gNB 1060b using a standard protocol, for example a wireless standard such as one provided by 3GPP. In fact, each of the devices illustrated in FIG. 18 represent a wide variety of different devices that can be used in different scenarios as discussed in more detail below. Any of these devices which are able to communicate wirelessly with a gNB, eNB or any other similar 3GPP access node may be considered a wireless device or UE.

Looking now at some of the possibilities, UE 1010a may be any of a variety of different devices that are able to wirelessly communicate with gNB 1060*a*. Some examples, which are listed in FIG. 18, include a virtual reality (VR) headset, a sensor, an actuator, a monitoring device, a vehicle, or a remote controller. These examples are not exhaustive and include therein a wide variety of more specific devices, including a wide range of Internet of Things (IoT) devices. For example, in embodiments where UE 1010*a* is a VR headset, UE 1010*a* may be a cell phone that is used with a head mount or it may be a standalone or dedicated VR headset. In some embodiments UE 1010*a* may be an augmented reality (AR) headset. As an AR or VR headset UE 1010*a* may be used for entertainment (e.g., gaming, videos, etc.), education/business (e.g., remote conferences, virtual lectures, etc.), medical (e.g., remote diagnostic, patient consultation, etc.), or any other use in which virtual or augmented content may be provided to a remote user. In any of these cases UE 1010*a* may be receiving content via wireless connection 1070*a* with gNB 1060*a*.

As another example, in embodiments where UE 1010*a* is a sensor or monitoring device, UE 1010*a* may be a motion, gravitational, moisture, temperature, biometric, speed, door/window open, smoke, fire, volume, flow, or any other type of device that is able to detect or measure one or more conditions. As a sensor UE 1010*a* may also be able to capture conditions. For example, UE 1010*a* may capture images if it comprises a camera or sound if it comprises a microphone. Regardless of the type of sensor, UE 1010*a* may provide an output via wireless connection 1070*a* to gNB 1060*a*. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, in embodiments where UE 1010*a* is an actuator, UE 1010*a* may be a motor, switch, or any other device that may change states in response to receiving an input via wireless connection 1070*a*. For example, UE 1010*a* may be a vibrator that creates vibration to provide a user with haptic feedback. As another example UE 1010*a* may be a small motor that adjusts the control surfaces of a drone in flight or to a robotic arm performing a medical procedure. As another example, UE 1010*a* may be a switch that remotely turns on another device, such as a light.

As another example, in embodiments where UE 1010*a* is a vehicle, UE 1010*a* may be a drone, car, plane, ship, train, tractor, robot, or any other type of device comprising one or more sensors and/or actuators that may change its locations whether autonomously or at the direction of a user. In such embodiments where UE 1010*a* is a remotely controlled vehicle, such as a drone, it may receive instructions on movement, actuating, or sensing from a user via wireless connection 1070*a* and provide location, sensor or video information back to the user via wireless connection 1070*a*. In such embodiments where UE 1010*a* is an autonomous vehicle it may receive alerts and other messages from other vehicles and/or infrastructure sensors via wireless connection 1070*a* as well provide its own telemetry data to others via wireless connection 1070*a*.

As another example, in embodiments where UE 1010*a* is a remote control, UE 1010*a* may be a device dedicated to controlling other devices or a general purpose computer with a program or application that provides control of other devices. UE 1010*a* may send commands to a remote device via wireless connection 1070*a*. UE 1010*a* may also receive feedback, telemetry, or other information from the remote device via wireless connection 1070*a*. UE 1010*a* may present this received information to a user who may then issue commands for the remote device. For example, UE 1010*a* may receive via wireless connection 1070*a* a video signal from a remote surgical room and then issue commands via wireless connection 1070*a* to a remote surgical machine that can execute the commands.

While only a single UE 1010*a* is illustrated in FIG. 18, in practice any number of UEs may be used together with respect to a single use case. For example, a first UE 1010*a* may be a speed sensor used in a drone which provides the drone's speed information to a second UE 1010*a* that is a remote control operating the drone. When the user makes changes from the remote control, a third UE 1010*a* that is an actuator may adjust a throttle on the drone to increase or decrease the speed. Similarly, in the example above, the first (sensor) and third (actuator) UE 1010*a*'s may be a single UE that handles communication for both the speed sensor and the actuators or UE QQA 110*a* may comprise one or more of the above. Similarly, in the example above, a hub, such as hub 1010*b*, may be used to handle communication between the sensors and actuators and the controller.

Hub 1010*b* may be any of a variety of different devices that provides wireless access to gNB 1060*b* for one or more remote devices 1015*a*. Some examples of different types of hubs are listed in Figure QAA and include a controller, router, content source and analytics. Hub 1010*b* may include memory to store data (e.g., video, audio, images, buffer, sensor data, file share) that is collected from, or is to be provided to, remote device 1015*a*. Hub 1010*b* hub may include a processor, operating system, and server functionality. Hub 1010*b* may include components for wireless communication to enable wireless connection QQA 171 to remote device 1015*a* and/or components for a fixed connection to remote device 1015*b*. Hub 1010*b* may also include routing capabilities, firewall capabilities, a VPN-server or VPN-client. Hub 1010*b* may also allow for a different communication scheme and/or schedule between hub 1010*b* and remote devices QQA115 and between hub 1010*b* and network 1006.

As one example, hub 1010*b* may be a broadband router enabling direct or indirect access to network 1006 for remote device 1015*a*. In certain embodiments, hub 1010*b* may facilitate communication between remote devices 1015*a* and 1015*b*. This may be done with, or without, the communications passing through network 1006. In some embodiments, hub 1010*b* may simply forward the data from remote device 1015*a* or 1015*b* to network 1006. In some embodiments, hub 1010*b* may first filter, buffer, store, analyze or collate the data from remote device 1015*a* or 1015*b* before sending on the data to network 1006 or another remote device. Similarly, the data from network 1006 may pass directly through hub 1010*b* or it may first be processed by hub 1010*b* on the way to remote device 1015*a* or 1015*b*.

As another example, hub 1010*b* may be a controller that sends commands or instructions to one or more actuators in remote device 1015*a*. The commands or instructions may be received from a second remote device 1015*b*, from gNB 1060*b* or by executable code, script or process instructions in hub 1010*b*.

As another example, hub 1010*b* may be a collection place for data from one or more remote devices 1015*a* and/or 1015*b*. For example, remote devices 1015*a* and/or 1015*b* may be a sensor, a camera, measurement equipment, or any other type of device discussed herein that may provide output or receive input. Hub 1010*b* may act as a temporary storage for data from, for example remote device 1015*b* and, in some embodiments, may perform analysis, or other processing on the data. Hub 1010*b* may have a constant/persistent or intermittent connection to gNB 1060*b*.

As another example, hub 1010*b* may be a content source. For example, when remote device 1015*a* is a VR headset, display, loudspeaker or other media delivery device, hub 1010*b* may retrieve VR assets, video, audio, or other media via gNB 1060*b* which it then provides to remote device 1015*a* either directly, after some local processing, and/or after adding additional local content.

Remote device 1015*a* may be any of a variety of different devices, for example, remote device 1015*a* may be a device comprising one or more of sensors, actuators, and/or a screen. Remote device 1015*a* may alternatively be a VR (or AR) headset, a Machine-2-Machine (M2M) device, an IoT device, an internet of Everything (IoE) device, or any other type of device which is capable of accessing a communication network wirelessly via a hub or a device capable of acting as a hub, which in the present context comprise providing network access to a device which is not able to communicate directly with communication network 1006 via gNB 1060*a* or 1060*b*. In some scenarios, remote device 1015*a* may be able to establish a wireless connection via gNB 1060*a* or 1060*b* yet nonetheless still connects via hub QQA 110*b*. Remote device 1015*b* may be similar to remote device 1015*a* in most respects except that it has a wired connection to hub 1010*b* rather than a wireless connection, such as wireless connection QQA 171.

gNBs 1060*a* and 1060*b* may provide various wireless devices such as UE 1010*a* and hub 1010*b* with wireless access to network 1006. Network 1006 may connect the various devices illustrated in FIG. 18 including server 1009 which may host a variety of applications such as live and pre-recorded content, data collection services such as retrieving and compiling data on various ambient conditions detected by a plurality of remote devices 1015*a*, 1015*b* or UE 1010*a*, analytics functionality, social media, functions for controlling or otherwise interacting with remote devices, functions for an alarm and surveillance center, or any other such function done by a server. For example, factory status information may be collected and analyzed by server 1009. As another example, server 1009 may process audio and video data which may have been retrieved from UE 1010*a* for use in creating maps. As another example, server 1009 may collect and analyze real-time data to assist in controlling vehicle congestion (e.g., controlling traffic lights). As another example, server 1009 may store surveillance video uploaded by remote device 1015*b* via hub 1010*b*. As another example, server 1009 may store media content such as video, audio, VR, or AR which it can broadcast, multicast or unicast to remote devices such as UE 1010*a* or remote device 1015*a*. As other examples, server 1009 may be used for energy pricing, for remote control of non-time critical electrical load to balance power generation needs, location services, presentation services (such as compiling diagrams etc. from data collected from remote devices), or any other function of collecting, retrieving, storing, analyzing and/or transmitting data.

Figure 19:
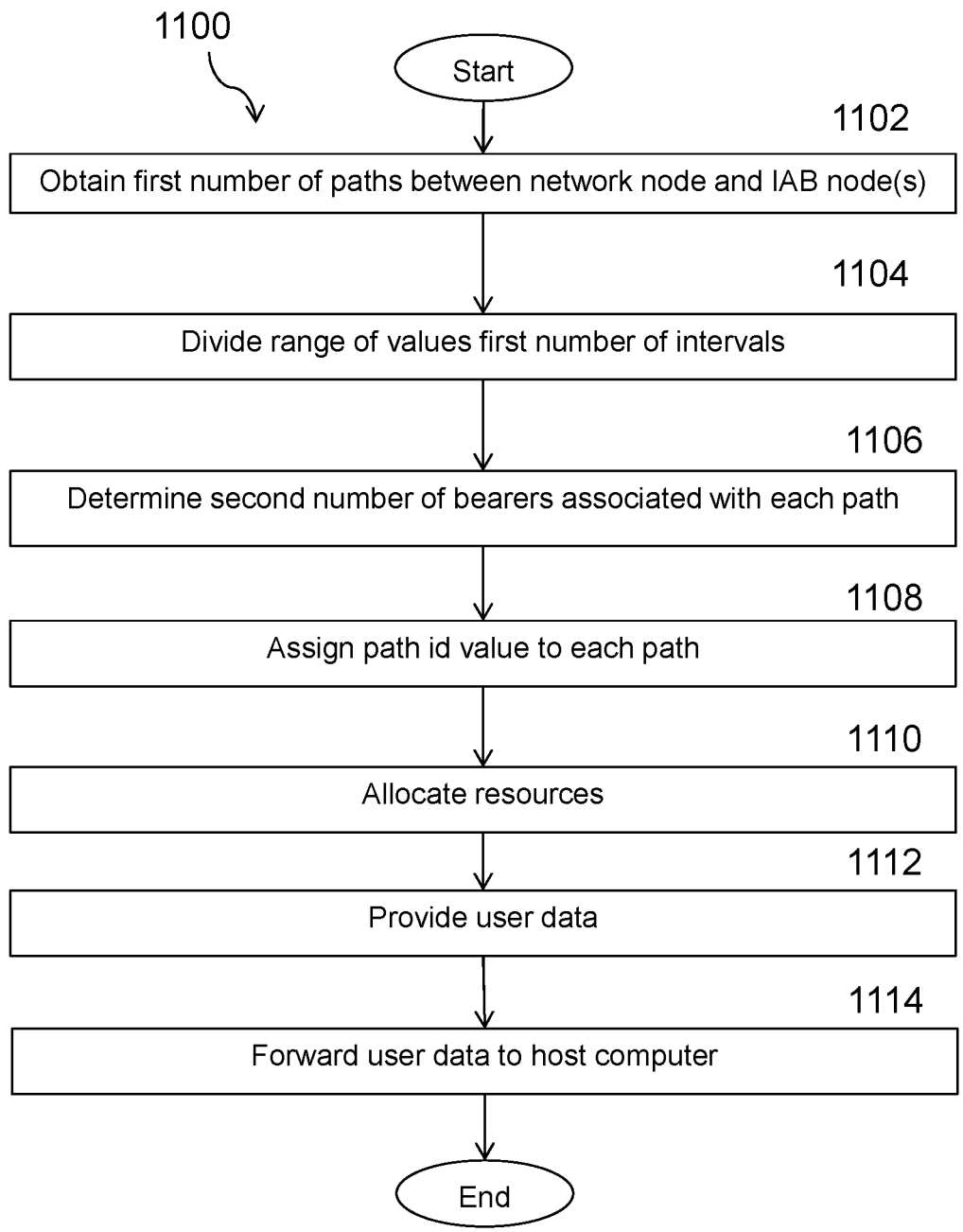
FIG. 19 illustrates an example method by a network node, according to certain embodiments.

FIG. 19 illustrates an example method 1100, in accordance with particular embodiments. The method begins at step 1102 with a network node 160, 1060 obtaining a first number of paths between the network node and one or more JAB nodes. The first number of paths may be based on network topology, feedback or other information provided by one or more other network nodes, one or more policies of the network operator, or any other relevant factor in the network implementation. In some embodiments, the first number may be a maximum number of paths. For example, a network operator may specify that a maximum of 10 paths may be used from the network node. In some embodiments the network node may determine the first number of paths based on the network topology.

At step 1104, the network node 160, 1060 divides a range of values into a first number intervals. Each interval is associated with a path from the network node to another IAB node. In some embodiments, each interval may have the same number of values. The range of values may be the range of values associated with the BAP Path ID sub-field. For example, if the BAP Path ID sub-field is 10 bits, then there is a range of vales from 0 to 1023 (or $2^{10}$ for 1024 values). If the first number of intervals is 8, then each interval may comprise 128 values (1024/8=128). More specifically, the first interval may have values 0-127, the second interval may have values 128-255, etc.

At step 1106 the network node 160, 1060 determines a second number of bearers associated with each path. This may be based on information collected at the network node directly or indirectly. For example, the network node may receive information from multiple downstream network nodes regarding the number of bearers they are supporting. From this information the network node may determine how many bearers are associated with a particular path.

At step 1108 the network node 160, 1060 assigns a path ID value to each path. The path ID value is based on the interval associated with the path and the number of bearers associated with the path. More specifically each value within an interval represents a different number of bears associated with the corresponding path. For example, in the scenario above, if each path has 128 or less bearers, then each subsequent value in the interval (except the first) may indicate that there is 1 additional bearer. For example, in the first interval (0-127) associated with a first path a 5 may indicate that there are 6 bearers, a 6 may indicate there are 7 bearers. Similarly, in the second interval (128-255) associated with a second path a 132 may indicate that there are 6 bearers and a 133 may indicate there are 7 bearers associated with the second path. If there are more than 128 bearers, then each value in the interval may represent multiple bearers. For example, if a path has 475 bearers then each value in the interval may indicate 4 more bearers than the subsequent value. For example, 2 may indicate that there are between 9 and 12 bearers associated with the path.

At step 1110 resources are allocated between the different paths using the number of bearers per path. That is, the number of bearers per path may be used for load balancing, fairness, etc.

At step 1112 user data is provided using the resources associated with the respective path and then at step 1114 the user data is forwarded towards a host computer.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 20:
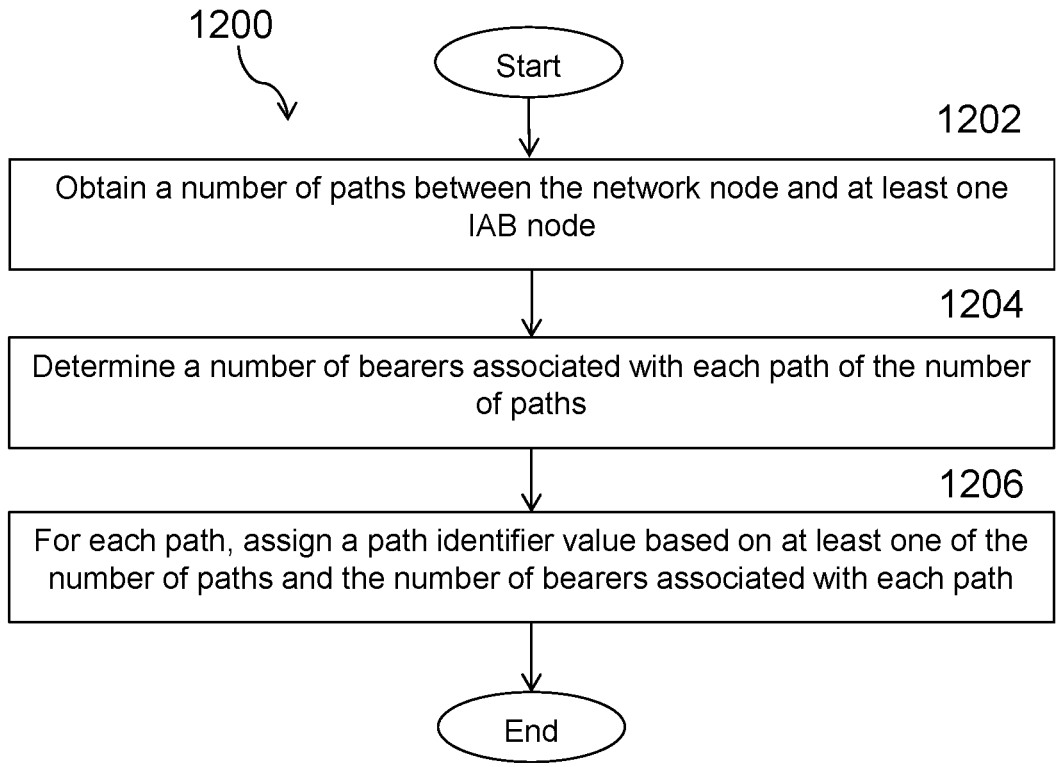
FIG. 20 illustrates an exemplary virtual computing device, according to certain embodiments.

FIG. 20 illustrates another example method 1200 by a network node 160, 1060, in accordance with particular embodiments. The method begins at step 1202 with a network node 160, 1060 obtaining a number of paths between the network node and at least one JAB node. At step 1204, the network node 160, 1060 determines a number of bearers associated with each path of the number of paths. At step 1206, for each path, the network node 160, 1060 assigns a path identifier value based on at least one of the number of paths and the number of bearers associated with each path.

In a particular embodiment, the network node 160 places the path identifier value in a BAP header of a packet and transmits the packet to the at least one JAB node.

In a particular embodiment, the network node 160 assigns at least one resource to the packet based on at least one of the path identifier value and the number of bearers.

In a further particular embodiment, the number of paths is a maximum number of paths.

In a further particular embodiment, the maximum number of paths is based on a network topology.

In a particular embodiment, the network node 160 divides a range of path identifier values into a plurality of intervals, and each interval is associated with a path from among the number of paths.

In a further particular embodiment, each one of the plurality of intervals comprises a unique portion of the range of path identifier values.

In a further particular embodiment, each interval is associated with at least one of a number of bearers; a number of users; a number of hops to a destination; and a Differentiated Service Code Point, DSCP, value.

In a further particular embodiment, each interval within the plurality of intervals comprises a same number of path identifier values within the range of path identifier values.

In a further particular embodiment, a first interval within the plurality of intervals comprises a first number of path identifier values within the range of path identifier values. A second interval within the plurality of intervals comprises a second number of path identifier values within the range of path identifier values, and the first number and the second number are different.

In a further particular embodiment, each path identifier value within each interval within the plurality of intervals is associated with a different number of bearers.

In a particular embodiment, the number of bearers comprises a number of UE bearers.

In a particular embodiment, the network node comprises a DU.

In a particular embodiment, the network node comprises an IAB node.

Figure 21:
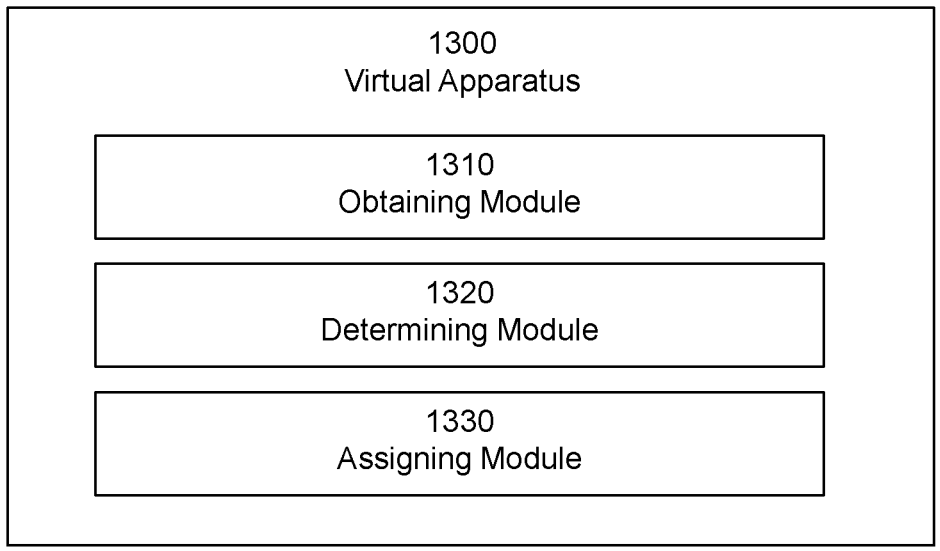
FIG. 21 illustrates another example method by a network node, according to certain embodiments.

FIG. 21 illustrates a schematic block diagram of a virtual apparatus 1300 in a wireless network (for example, the wireless network shown in FIGS. 7 and/or 18). The apparatus may be implemented in a wireless device or network node (e.g., wireless device 110, 1010 or network node 160, 1060 shown in FIGURES and/or 18). Apparatus 1300 is operable to carry out the example method described with reference to FIG. 20 and possibly any other processes or methods disclosed herein. It is also to be understood that the method of FIG. 20 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1310, determining module 1320, assigning module 1330, and any other suitable units of apparatus 1300 to perform corresponding functions according one or more embodiments of the present disclosure.

According to certain embodiments, obtaining module 1310 may perform certain of the obtaining functions of the apparatus 1300. For example, obtaining module 1310 may obtain a number of paths between the network node and at least one JAB node.

According to certain embodiments, determining module 1320 may perform certain of the determining functions of the apparatus 1300. For example, determining module 1320 may determine a number of bearers associated with each path of the number of paths.

According to certain embodiments, assigning module 1330 may perform certain of the assigning functions of the apparatus 1300. For example, assigning module 1330 may assign a path identifier value based on at least one of the number of paths and the number of bearers associated with each path.

As used herein, the term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 22:
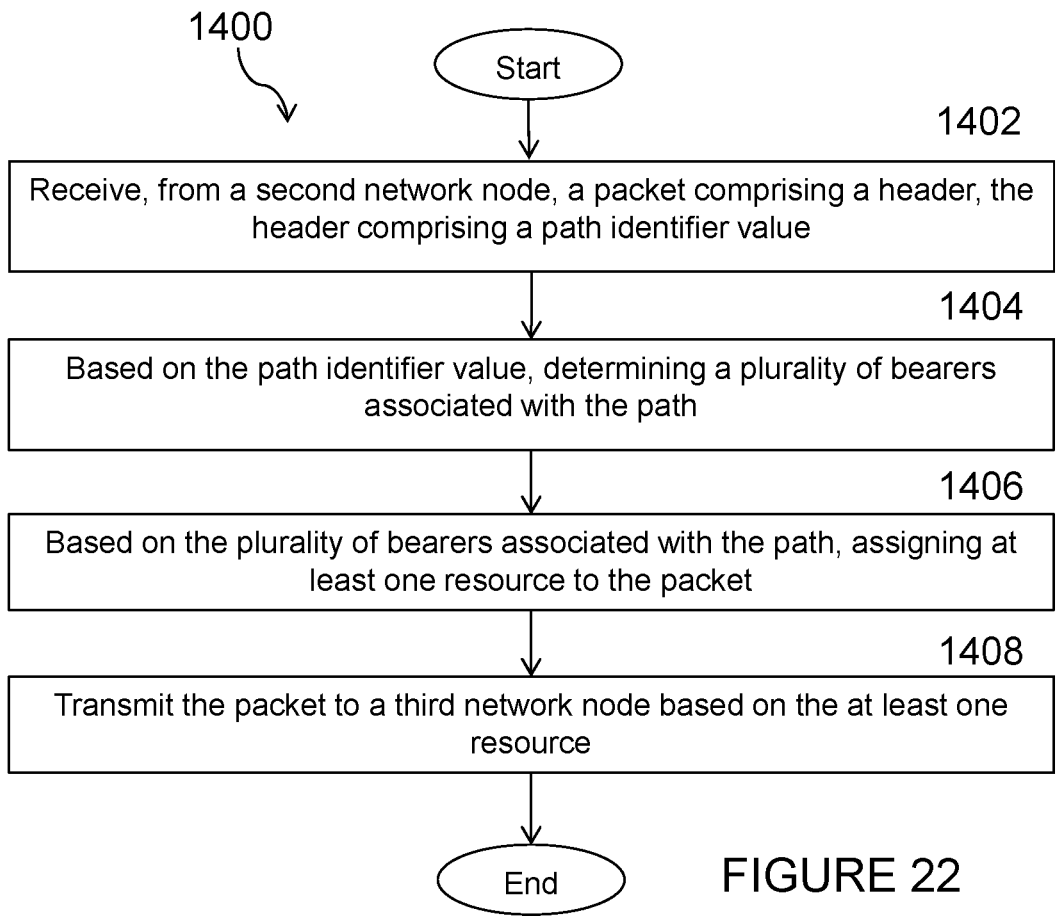
FIG. 22 illustrates another exemplary virtual computing device, according to certain embodiments.

FIG. 22 illustrates another example method 1400 by a first network node 160, 1060, in accordance with particular embodiments. The method begins at step 1402 with a first network node 160, 1060 receiving, from a second network node 160, 1060, a packet comprising a header that includes a path identifier value. Based on the path identifier value, the first network node 160, 1060 determines a plurality of bearers associated with the path, at step 1404. Based on the plurality of bearers associated with the path, the first network node 160, 1060 assigns at least one resource to the packet, at step 1406. At step 1408, the first network node 160, 1060 transmits the packet to a third network node based on the at least one resource.

In a particular embodiment, based on the path identifier value, the first network node 160, 1060 determines that the first network node is not a destination node for the packet.

In a particular embodiment, based on the path identifier value in the header of the packet, the first network node 160, 1060 determines a path associated with the packet.

In a particular embodiment, the first network node 160, 1060 determines that at least one of the plurality of bearers is terminated at the first network node. Prior to transmitting the packet to the third network node, the first network node 160, 1060 modifies the path identifier value to remove the at least one of the plurality of bearers that is terminated at the first network node 160, 1060.

In a particular embodiment, the header a BAP header.

In a particular embodiment, a range of path identifier values is divided into a plurality of intervals, and each interval being associated with a path within a plurality of paths. The first network node 160, 1060 determines the path of the packet based on the path identifier value in the header of the packet.

In a further particular embodiment, the number of paths is a maximum number of paths.

In a further particular embodiment, the maximum number of paths is based on a network topology.

In a further particular embodiment, each interval is associated with at least one of: a number of bearers; a number of users; a number of hops to a destination; and a Differentiated Service Code Point, DSCP, value.

In a further particular embodiment, each interval within the plurality of intervals comprises a same number of path identifier values within the range of path identifier values.

In a further particular embodiment, a first interval within the plurality of intervals comprises a first number of path identifier values within the range of path identifier values, and a second interval within the plurality of intervals comprises a second number of path identifier values within the range of path identifier values. The first number and the second number are different.

In a further particular embodiment, each path identifier value within each interval within the plurality of intervals is associated with a different number of bearers.

In a further particular embodiment, the number of bearers comprises a number of UE bearers.

In a particular embodiment, the first network node comprises an IAB node.

In a particular embodiment, the second network node comprises a DU or an IAB node.

In a particular embodiment, the third network node comprises an IAB node.

Figure 23:
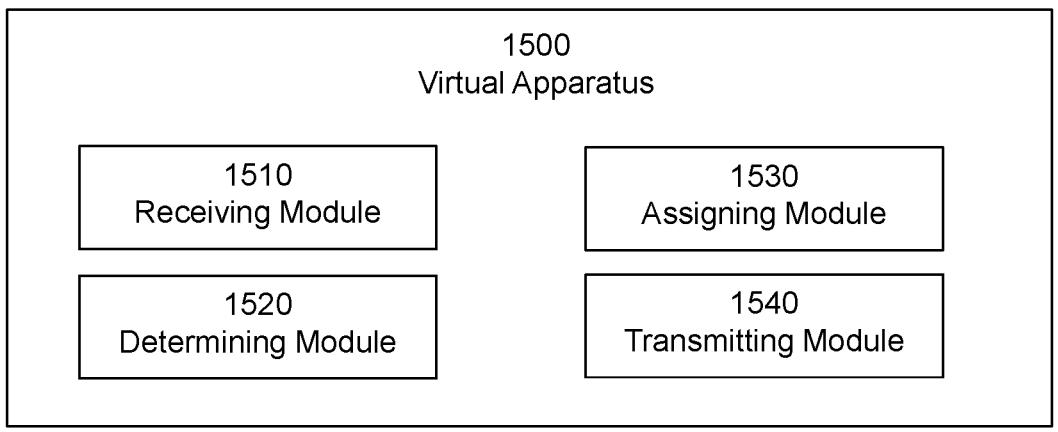
FIG. 23 illustrates another example method by a network node, according to certain embodiments.

FIG. 23 illustrates a schematic block diagram of a virtual apparatus 1500 in a wireless network (for example, the wireless network shown in FIGS. 7 and/or 18). The apparatus may be implemented in a wireless device or network node (e.g., wireless device 110, 1010 or network node 160, 1060 shown in FIGURES and/or 18). Apparatus 1500 is operable to carry out the example method described with reference to FIG. 22 and possibly any other processes or methods disclosed herein. It is also to be understood that the method of FIG. 22 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1510, determining module 1520, assigning module 1530, transmitting module 1540, and any other suitable units of apparatus 1500 to perform corresponding functions according one or more embodiments of the present disclosure.

According to certain embodiments, receiving module 1510 may perform certain of the receiving functions of the apparatus 1500. For example, receiving module 1510 may receive, from a second network node 160, 1060, a packet comprising a header that includes a path identifier value.

According to certain embodiments, determining module 1520 may perform certain of the determining functions of the apparatus 1500. For example, determining module 1520 may determine, based on the path identifier value, a plurality of bearers associated with the path.

According to certain embodiments, assigning module 1530 may perform certain of the assigning functions of the apparatus 1500. For example, assigning module 1530 may assign, based on the plurality of bearers associated with the path, at least one resource to the packet.

According to certain embodiments, transmitting module 1540 may perform certain of the transmitting functions of the apparatus 1500. For example, transmitting module 1540 may transmit the packet to a third network node based on the at least one resource.

Example Embodiments

Example Embodiment 1. A method performed by a network node for employing BAP Path ID, the method comprising: obtain a first number of paths between the network node and at least one JAB node; divide a range of values into the first number of intervals wherein each interval comprises the same number of values and wherein each interval is associated with one path from among the first number of paths; determine a second number of bearers associated with each of the first number of paths; and assign a path id value for each path based on the determined number of bearers associated with the path wherein and the interval associated with the path.

Example Embodiment 2. The method of Example Embodiment 1 wherein the first number of paths is a maximum number of paths.

Example Embodiment 3. The method of Example Embodiment 2 wherein the maximum number of paths is based on network implementation, including at least network topology.

Example Embodiment 4. The method of any one or more of Example Embodiments 1-3 wherein each value within an interval is associated with a different number of bearers.

Example Embodiment 5. The method of any one or more of Example Embodiments 1-4 wherein the path IDs can be used to facilitate resource allocation based on determined number of bearers associated with each of the paths.

Example Embodiment 6. The method of any of the previous embodiments, further comprising: providing user data; and forwarding the user data to a host computer via the transmission to the base station.

Example Embodiment 7. A base station for employing BAP Path ID, the base station comprising: processing circuitry configured to perform any of the steps of any of Example Embodiments 1 to 6; power supply circuitry configured to supply power to the base station.

Example Embodiment 8. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of Example Embodiments 1 to 6.

Example Embodiment 9. The communication system of the previous Example Embodiment further including the base station.

Example Embodiment 10. The communication system of the previous 2 Example Embodiments, further including the UE, wherein the UE is configured to communicate with the base station.

Example Embodiment 11. The communication system of the previous 3 Example Embodiments, wherein: the processing circuitry of the host computer is configured to execute a host application, thereby providing the user data; and the UE comprises processing circuitry configured to execute a client application associated with the host application.

Example Embodiment 12. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of Example Embodiments 1 to 6.

Example Embodiment 13. The method of the previous Example Embodiment, further comprising, at the base station, transmitting the user data.

Example Embodiment 14. The method of the previous 2 Example Embodiments, wherein the user data is provided at the host computer by executing a host application, the method further comprising, at the UE, executing a client application associated with the host application.

Example Embodiment 15. A user equipment (UE) configured to communicate with a base station, the UE comprising a radio interface and processing circuitry configured to performs the of the previous 3 Example Embodiments.

Example Embodiment 16. A communication system including a host computer comprising: processing circuitry configured to provide user data; and a communication interface configured to forward user data to a cellular network for transmission to a user equipment (UE), wherein the UE comprises a radio interface and processing circuitry.

Example Embodiment 17. The communication system of the previous embodiment, wherein the cellular network further includes a base station configured to communicate with the UE.

Example Embodiment 18. The communication system of the previous 2 embodiments, wherein: the processing circuitry of the host computer is configured to execute a host application, thereby providing the user data; and the UE's processing circuitry is configured to execute a client application associated with the host application.

Example Embodiment 19. A method implemented in a communication system including a host computer, a base station and a user equipment (UE), the method comprising: at the host computer, providing user data; and at the host computer, initiating a transmission carrying the user data to the UE via a cellular network comprising the base station.

Example Embodiment 20. The method of the previous Example Embodiment, further comprising at the UE, receiving the user data from the base station.

Example Embodiment 21. A communication system including a host computer comprising: communication interface configured to receive user data originating from a transmission from a user equipment (UE) to a base station, wherein the UE comprises a radio interface and processing circuitry.

Example Embodiment 22. The communication system of the previous Example Embodiment, further including the UE.

Example Embodiment 23. The communication system of the previous 2 Example Embodiments, further including the base station, wherein the base station comprises a radio interface configured to communicate with the UE and a communication interface configured to forward to the host computer the user data carried by a transmission from the UE to the base station.

Example Embodiment 24. The communication system of the previous 3 Example Embodiments, wherein: the processing circuitry of the host computer is configured to execute a host application; and the UE's processing circuitry is configured to execute a client application associated with the host application, thereby providing the user data.

Example Embodiment 25. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 26. A method implemented in a communication system including a host computer, a base station and a user equipment (UE), the method comprising: at the host computer, receiving user data transmitted to the base station from the UE, wherein the base station performs any of the steps of any of Example Embodiments 1 to 6.

Example Embodiment 27. The method of the previous Example Embodiment, further comprising, at the UE, providing the user data to the base station.

Example Embodiment 28. The method of the previous 2 Example Embodiments, further comprising: at the UE, executing a client application, thereby providing the user data to be transmitted; and at the host computer, executing a host application associated with the client application.

Example Embodiment 29. The method of the previous 3 Example Embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 30. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of Example Embodiments 1 to 6.

Example Embodiment 31. The communication system of the previous embodiment further including the base station.

Example Embodiment 32. The communication system of the previous 2 Example Embodiments, further including the UE, wherein the UE is configured to communicate with the base station.

Example Embodiment 33. The communication system of the previous 3 embodiments, wherein: the processing circuitry of the host computer is configured to execute a host application; the UE is configured to execute a client application associated with the host application, thereby providing the user data to be received by the host computer.

Example Embodiment 34. A method implemented in a communication system including a host computer, a base station and a user equipment (UE), the method comprising: at the host computer, receiving, from the base station, user data originating from a transmission which the base station has received from the UE, wherein the base station performs any of the steps of any of Example Embodiments 1 to 6.

Example Embodiment 35. The method of the previous embodiment, further comprising at the base station, receiving the user data from the UE.

Example Embodiment 36. The method of the previous 2 Example Embodiments, further comprising at the base station, initiating a transmission of the received user data to the host computer.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a network node, the method comprising:
   obtaining a number of paths between the network node and at least one Integrated Access Backhaul, IAB, node;
   determining a number of bearers associated with each path of the number of paths; and
   for each path, assigning a path identifier value based on at least one of the number of paths and the number of bearers associated with each path.

2. A network node comprising:
   processing circuitry configured to:
   obtain a number of paths between the network node and at least one Integrated Access Backhaul, IAB, node;
   determine a number of bearers associated with each path of the number of paths; and
   for each path, assign a path identifier value based on the number of paths and the number of bearers associated with each path.

3. The network node of claim 2, wherein the processing circuitry is configured to:
   place the path identifier value in a Backhaul Adaptation Protocol, BAP, header of a packet; and
   transmit the packet to the at least one IAB node.

4. The network node of claim 3, wherein the processing circuitry is configured to assign at least one resource to the packet based on at least one of the path identifier value and the number of bearers.

5. The network node of claim 2, wherein the number of paths is a maximum number of paths.

6. The network node of claim 5, wherein the maximum number of paths is based on a network topology.

7. The network node of claim 2, wherein the processing circuitry is configured to divide a range of path identifier values into a plurality of intervals, wherein each interval is associated with a path from among the number of paths.

8. The network node of claim 7, wherein each one of the plurality of intervals comprises a unique portion of the range of path identifier values.

9. The network node of claim 7, wherein each interval is associated with at least one of:
   a number of bearers;
   a number of users;
   a number of hops to a destination; and
   a Differentiated Service Code Point, DSCP, value.

10. The network node of claim 7, wherein each interval within the plurality of intervals comprises a same number of path identifier values within the range of path identifier values.

11. The network node of claim 7, wherein:
   a first interval within the plurality of intervals comprises a first number of path identifier values within the range of path identifier values,
   a second interval within the plurality of intervals comprises a second number of path identifier values within the range of path identifier values, and
   the first number and the second number are different.

12. The network node of claim 7, wherein each path identifier value within each interval within the plurality of intervals is associated with a different number of bearers.

13. The network node of claim 2, wherein the number of bearers comprises a number of UE bearers.

14. The network node of claim 2 wherein the network node comprises a Distributed Unit, DU.

15. The network node of claim 2, wherein the network node comprises an IAB node.

16. A method performed by a first network node, the method comprising:
   receiving, from a second network node, a packet comprising a header, the header comprising a path identifier value;
   based on the path identifier value, determining a plurality of bearers associated with the path; and
   based on the plurality of bearers associated with the path, assigning at least one resource to the packet; and
   transmitting the packet to a third network node based on the at least one resource.

17. A first network node comprising:
   processing circuitry configured to:
   receive, from a second network node, a packet comprising a header, the header comprising a path identifier value;
   based on the path identifier value, determine a plurality of bearers associated with a path; and
   based on the plurality of bearers associated with the path, assign at least one resource to the packet; and
   transmit the packet to a third network node based on the at least one resource.

18. The first network node of claim 17, wherein the processing circuitry is configured to:
   based on the path identifier value, determine that the first network node is not a destination node for the packet.

19. The first network node of claim 17, wherein the processing circuitry is configured to:
based on the path identifier value in the header of the packet, determine a path associated with the packet.

20. The first network node of claim 17, wherein the processing circuitry is configured to:
determine that at least one of the plurality of bearers is terminated at the first network node; and
prior to transmitting the packet to the third network node, modify the path identifier value to remove the at least one of the plurality of bearers that is terminated at the first network node.

21. The first network node of claim 17, wherein the header comprises a Backhaul Adaptation Protocol, BAP, header.

22. The first network node of claim 17, wherein a range of path identifier values is divided into a plurality of intervals, each interval being associated with a path within a plurality of paths, and the method further comprises determining the path of the packet based on the path identifier value in the header of the packet.

23. The first network node of claim 22, wherein the number of paths is a maximum number of paths.

24. The first network node of claim 23, wherein the maximum number of paths is based on a network topology.

25. The method of claim 22, wherein each interval is associated with at least one of:
a number of bearers;
a number of users;
a number of hops to a destination; and
a Differentiated Service Code Point, DSCP, value.

26. The first network node of claim 22, wherein each interval within the plurality of intervals comprises a same number of path identifier values within the range of path identifier values.

* * * * *